(12) United States Patent
Weatherall et al.

(10) Patent No.: US 11,370,156 B2
(45) Date of Patent: Jun. 28, 2022

(54) MOLDING APPARATUS AND METHOD OF CONTROLLING SAME

(71) Applicant: HUSKY INJECTION MOLDING SYSTEMS LTD., Bolton (CA)

(72) Inventors: Douglas James Weatherall, Bolton (CA); Daoshan Ouyang, Bolton (CA); Zhiming Wang, Woodbridge (CA)

(73) Assignee: HUSKY INJECTION MOLDING SYSTEMS LTD., Bolton (CA)

( * ) Notice: Subject to any disclaimer, the term of this patent is extended or adjusted under 35 U.S.C. 154(b) by 461 days.

(21) Appl. No.: 16/335,403

(22) PCT Filed: Sep. 5, 2017

(86) PCT No.: PCT/CA2017/051040
§ 371 (c)(1),
(2) Date: Mar. 21, 2019

(87) PCT Pub. No.: WO2018/064750
PCT Pub. Date: Apr. 12, 2018

(65) Prior Publication Data
US 2020/0016812 A1    Jan. 16, 2020

Related U.S. Application Data

(60) Provisional application No. 62/450,137, filed on Jan. 25, 2017, provisional application No. 62/404,248, filed on Oct. 5, 2016.

(51) Int. Cl.
| | | |
|---|---|---|
| *B29C 45/76* | (2006.01) | |
| *B29C 45/40* | (2006.01) | |
| *B29L 31/56* | (2006.01) | |

(52) U.S. Cl.
CPC ......... *B29C 45/7626* (2013.01); *B29C 45/40* (2013.01); *B29C 2945/76595* (2013.01);
(Continued)

(58) Field of Classification Search
CPC ............... B29C 45/7626; B29C 45/40; B29C 2945/76595; B29C 2945/76722;
(Continued)

(56) References Cited

U.S. PATENT DOCUMENTS

| | | | | |
|---|---|---|---|---|
| 3,893,644 A | * | 7/1975 | Drazick | .............. B29C 45/4005 249/68 |
| 4,118,168 A | | 10/1978 | Rees et al. | |

(Continued)

FOREIGN PATENT DOCUMENTS

| | | |
|---|---|---|
| CN | 104185542 A | 12/2014 |
| EP | 2894020 A1 | 7/2015 |
| WO | 2013173918 A1 | 11/2013 |

OTHER PUBLICATIONS

Shoemaker, J., "Moldflow Design Guide: A Resource for Plastics Engineers", Appendix C, 2006, p. 276, Step 12.
(Continued)

*Primary Examiner* — Matthew J Daniels
*Assistant Examiner* — Gregory C. Grosso

(57) ABSTRACT

There is disclosed a method (400) of ejecting a molded article (310, 312) from an injection mold (100). The method (400) comprises: during a second portion of the mold opening cycle of the injection mold (100), the second portion occurring later in time relative to a first portion of the mold opening cycle of the injection mold (100): controlling velocity of at least one of: (i) the moveable mold half (102, 502) relative to the stationary mold half (104, 504), (ii) the ejector (230) relative to the moveable mold half (102, 502); and (iii) an ejector actuator linked to the core insert (112, 114, 512, 514); and (iv) a stripper actuator that is linked to the stripper sleeve (116, 516); the controlling executed such that the molded article (310, 312, 506) is ejected from the
(Continued)

molding component with a substantially zero departure-velocity along the first axis of operation.

18 Claims, 18 Drawing Sheets

(52) U.S. Cl.
CPC .............. *B29C 2945/76722* (2013.01); *B29C 2945/76732* (2013.01); *B29L 2031/565* (2013.01)

(58) Field of Classification Search
CPC .......... B29C 2945/76732; B29C 33/44; B29C 33/442; B29C 33/444; B29C 2045/4078; B29C 37/0017; B29L 2031/565
USPC ........................................................ 264/334
See application file for complete search history.

(56) References Cited

U.S. PATENT DOCUMENTS

| | | | |
|---|---|---|---|
| 5,230,856 A | * | 7/1993 | Schellenbach ...... B29C 45/4407 249/59 |
| 5,256,364 A | | 10/1993 | Herbst |
| 5,736,079 A | * | 4/1998 | Kamiguchi ......... B29C 45/7626 264/40.1 |
| 6,394,786 B1 | | 5/2002 | Hefner |
| 7,462,319 B2 | | 12/2008 | Keir et al. |
| 2002/0140119 A1 | * | 10/2002 | Hofmann ................ B29C 45/76 264/40.1 |
| 2006/0131788 A1 | | 6/2006 | Takigawa |
| 2008/0026095 A1 | | 1/2008 | Wessely et al. |
| 2013/0251837 A1 | | 9/2013 | Takeuchi et al. |
| 2014/0077416 A1 | * | 3/2014 | Halter .................... B29C 45/36 264/328.1 |
| 2014/0178515 A1 | | 6/2014 | Ito et al. |
| 2015/0069662 A1 | | 3/2015 | Mai et al. |

OTHER PUBLICATIONS

PCT International Search Report, dated Nov. 10, 2017, 3 pages.
Plastics & Rubber Weekly, Curtain falls on all-electric cascade challenge Jan. 16, 2015.

* cited by examiner

MOLDING APPARATUS AND METHOD OF CONTROLLING SAME

TECHNICAL FIELD

The non-limiting embodiments disclosed herein generally relate to a molding apparatus, and more particularly to a molding apparatus and a method of controlling same.

BACKGROUND

Molding is a process by virtue of which a molded article can be formed from molding material by using a molding system. Various molded articles can be formed by using the molding process, such as an injection molding process. One example of a molded article that can be formed is a closure for a container, such as a bottle. Several types of closures can be made, depending on the type of the container that the closure is to be used with. Depending on the type of the container the closure is destined to be used with, the closure is designed with specific design considerations in mind. For example, a closure for a carbonated beverage is different in design from a closure for still water (at least in the sealing features used for the closure for the carbonated beverage).

Another example of a molded article that can be formed, for example, from Polyethylene Terephthalate (PET) material is a preform that is capable of being subsequently blown into a beverage container, such as, a bottle and the like. As an illustration, injection molding of PET material involves heating the molding material (ex. PET pellets, etc.) to a homogeneous molten state and injecting, under pressure, the so-melted PET material into a molding cavity defined, at least in part, by a female cavity piece and a male core piece mounted respectively on a cavity plate and a core plate of the mold. The cavity plate and the core plate are urged together and are held together by clamp force, the clamp force being sufficient enough to keep the cavity and the core pieces together against the pressure of the injected PET material. The molding cavity has a shape that substantially corresponds to a final cold-state shape of the molded article to be molded. The so-injected PET material is then cooled to a temperature sufficient to enable ejection of the so-formed molded article from the mold. When cooled, the molded article shrinks inside of the molding cavity and, as such, when the cavity and core plates are urged apart, the molded article tends to remain associated with the core piece. Accordingly, by urging the core plate away from the cavity plate, the molded article can be demolded, i.e. ejected off of the core piece. Ejection structures are known to assist in removing the molded articles from the core halves. Examples of the ejection structures include stripper plates, ejector pins, etc.

SUMMARY

According to a first broad aspect of the present technology, there is provided a method of ejecting a molded article from an injection mold. The injection mold includes a stationary mold half and a movable half. The moveable mold half further includes a molding component for defining, in use, at least a portion of the molded article, the molding component including to a core insert and a stripper sleeve positionable around the core insert. The injection mold is configured to be used in a molding machine, the molding machine having a controller apparatus. The method is executable by the controller apparatus. The method comprises: during a first portion of a mold opening cycle of the injection mold: initiating opening the injection mold with movement of the moveable mold half through a mold stroke away from the stationary mold half from a mold closed position towards a mold open position; initiating movement of an ejector of the moveable mold half through an ejector stroke from a molding position towards an ejection position relative to the moveable mold half; the opening the injection mold and moving the ejector being done along a first axis of operation of the injection mold in relatively opposite directions of movement; during a second portion of the mold opening cycle of the injection mold, the second portion occurring later in time relative to the first portion of the mold opening cycle of the injection mold: controlling velocity of at least one of (i) the moveable mold half relative to the stationary mold half, (ii) the ejector relative to the moveable mold half, (iii) an ejector actuator linked to the core insert; and (iv) a stripper actuator that is linked to the stripper sleeve; the controlling executed such that the molded article is ejected from the molding component with a substantially zero departure-velocity along the first axis of operation; the second portion being initiated at a predetermined portion of the mold opening cycle, the predetermined portion being when the molded article is at a final contact point with the molding component.

In some implementations of the method, the controlling velocity comprises matching velocity, in opposing directions, of (i) the moveable mold half and (ii) the ejector.

In some implementations of the method, during (i) the initiating movement of the moveable mold half and (ii) initiating movement of an ejector, the velocities of the moveable mold half and the ejector are controlled independently from each other.

In some implementations of the method, during (i) the initiating movement of the moveable mold half and (ii) initiating movement of an ejector, the velocities of the moveable mold half and the ejector are controlled to minimize an overall mold opening time during the mold opening portion of the cycle of the injection mold.

In some implementations of the method, the matching velocity, in opposing directions, of (i) the moveable mold half and (ii) the ejector is only executed during the second portion of the mold opening cycle of the injection mold, which substantially coincides with the predetermined to portion of the mold opening cycle.

In some implementations of the method, the matching velocity is commenced a first pre-determined period of time before the predetermined portion of the mold opening cycle and continues for a second pre-determined period of time after the predetermined portion of the mold opening cycle.

In some implementations of the method, matching velocity comprises controlling at least one of (i) the opening speed of the moveable mold half and (ii) the speed of the ejector.

In some implementations of the method, the molded article is one of a plurality of molded articles that are moldable in the injection mold, and wherein matching velocity comprises matching at least one of: (a) velocity of the moveable mold half and (b) velocity of the ejector to an average departure-velocity of the plurality of molded articles.

In some implementations of the method, the molded article is one of a plurality of molded articles that are moldable in the injection mold, and wherein matching velocity comprises matching at least one of: (a) velocity of the moveable mold half and (b) velocity of the ejector to a departure-velocity of a slowest one of the plurality of molded articles.

In some implementations of the method, the molded article is a closure having a threaded portion, and wherein the final contact point of the molded article with the molding component occurs when a stripper sleeve portion of the molding component clears the threaded portion.

In some implementations of the method, the molded article is a closure having a tamper evident band (TEB), and wherein the final contact point of the molded article with the molding component occurs when the molding component engages only the TEB of the closure.

In some implementations of the method, the method further comprises receiving, from an operator of the injection mold, an indication of a pre-determined ejection position, the pre-determined ejection position being associated with a position of the moveable mold half during its mold stroke and the ejector during its ejector stroke where the molded article is to depart from the molding component and wherein the controlling velocity comprises:

commencing execution of controlling velocity at a pre-determined ejection position before the pre-determined ejection position.

In some implementations of the method, the commencing execution comprises delaying starting an ejector profile execution.

In some implementations of the method, the molded article is one of a plurality of molded articles that are moldable in the mold, and wherein controlling velocity is executed such that to minimize velocity differential between a first departure-velocity of a slowest molded article and a second departure-velocity of a fasted molded article, the first departure-velocity and the second departure-velocity being along the first axis of operation of the injection mold.

In some implementations of the method, controlling velocity is executed such that the plurality of molded article are ejected from the injection mold substantially only in a direction that is substantially perpendicular to the first axis of operation of the injection mold.

In some implementations of the method, the controlling comprises only controlling at least one of: the ejector actuator linked to the core insert; and the stripper actuator that is linked to the stripper sleeve.

In some implementations of the method, the controlling comprises: coordinating actuation of the ejector actuator linked to the core insert and the stripper actuator that is linked to the stripper sleeve for movement of the core insert and the stripper sleeve in opposite directions.

In some implementations of the method, the core insert comprises an inner core and an outer core and wherein the only controlling at least one of the ejector actuator linked to the core insert; and the stripper actuator that is linked to the stripper sleeve comprises controlling the ejector actuator linked to the inner core.

According to another broad aspect of the present technology, there is provided a non-transitory computer readable medium, the non-transitory computer readable medium storing computer executable instructions, which computer executable instructions when executed can cause a controller apparatus of a molding machine to a execute a method of ejecting a molded article from an injection mold. The injection mold includes a stationary mold half and a movable half, the moveable mold half further including a molding component for defining, in use, at least a portion of the molded article, the molding component including a core insert and a stripper sleeve positionable around the core insert. The method comprises: during a first portion of a mold opening cycle of the mold: initiating opening the injection mold with movement of the moveable mold half through a mold stroke away from the stationary mold half from a mold closed position towards a mold open position; initiating movement of an ejector of the moveable mold half through an ejector stroke from a molding position towards an ejection position relative to the moveable mold half; the opening the injection mold and moving the ejector being done along a first axis of operation of the injection mold in relatively opposite directions of movement; during a second portion of the mold opening cycle of the injection mold, the second portion occurring later in time relative to the first portion of the mold opening cycle of the injection mold: controlling velocity of at least one of (i) the moveable mold half relative to the stationary mold half, (ii) the ejector relative to the moveable mold half, (iii) an ejector actuator linked to the core insert; and (iv) a stripper actuator that is linked to the stripper sleeve; the controlling executed such that the molded article is ejected from the molding component with a substantially zero departure-velocity along the first axis of operation; the second portion being initiated at a predetermined portion of the mold opening cycle, the predetermined portion being when the molded article is at a final contact point with the molding component.

According to another broad aspect of the present technology, there is provided a molding machine. The molding machine comprises: an injection unit for plasticizing molding material; a clamping unit; an injection mold positionable, in use, in the clamping unit, the injection mold including a stationary mold half and a movable half, the moveable mold half further including a molding component for defining, in use, at least a portion of a molded article using the molding material, the molding component including a core insert and a stripper sleeve positionable around the core insert. A controller apparatus for controlling operation of at least one of: the movable half, the injection unit and the clamping unit, the controller apparatus being configured to: during a first portion of a mold opening cycle of the injection mold: initiate opening the injection mold with movement of the moveable mold half through a mold stroke away from the stationary mold half from a mold closed position towards a mold open position; initiate movement of an ejector of the moveable mold half through an ejector stroke from a molding position towards an ejection position relative to the moveable mold half; the opening the injection mold and moving the ejector being done along a first axis of operation of the injection mold in relatively opposite directions of movement; during a second portion of the mold opening cycle of the injection mold, the second portion occurring later in time relative to the first portion of the mold opening cycle of the injection mold: control velocity of at least one of (i) the moveable mold half relative to the stationary mold half, (ii) the ejector relative to the moveable mold half, (iii) an ejector actuator linked to the core insert; and (iv) a stripper actuator that is linked to the stripper sleeve; the controlling executed such that the molded article is ejected from the molding component with a substantially zero departure-velocity along the first axis of operation; the second portion being initiated at a predetermined portion of the mold opening cycle, the predetermined portion being when the molded article is at a final contact point with the molding component.

These and other aspects and features will now become apparent to those skilled in the art upon review of the following description of specific non-limiting embodiments in conjunction with the accompanying drawings.

DETAILED DESCRIPTION OF THE DRAWINGS

The detailed description of illustrative (non-limiting) embodiments will be more fully appreciated when taken in conjunction with the accompanying drawings, in which.

Figure 1:
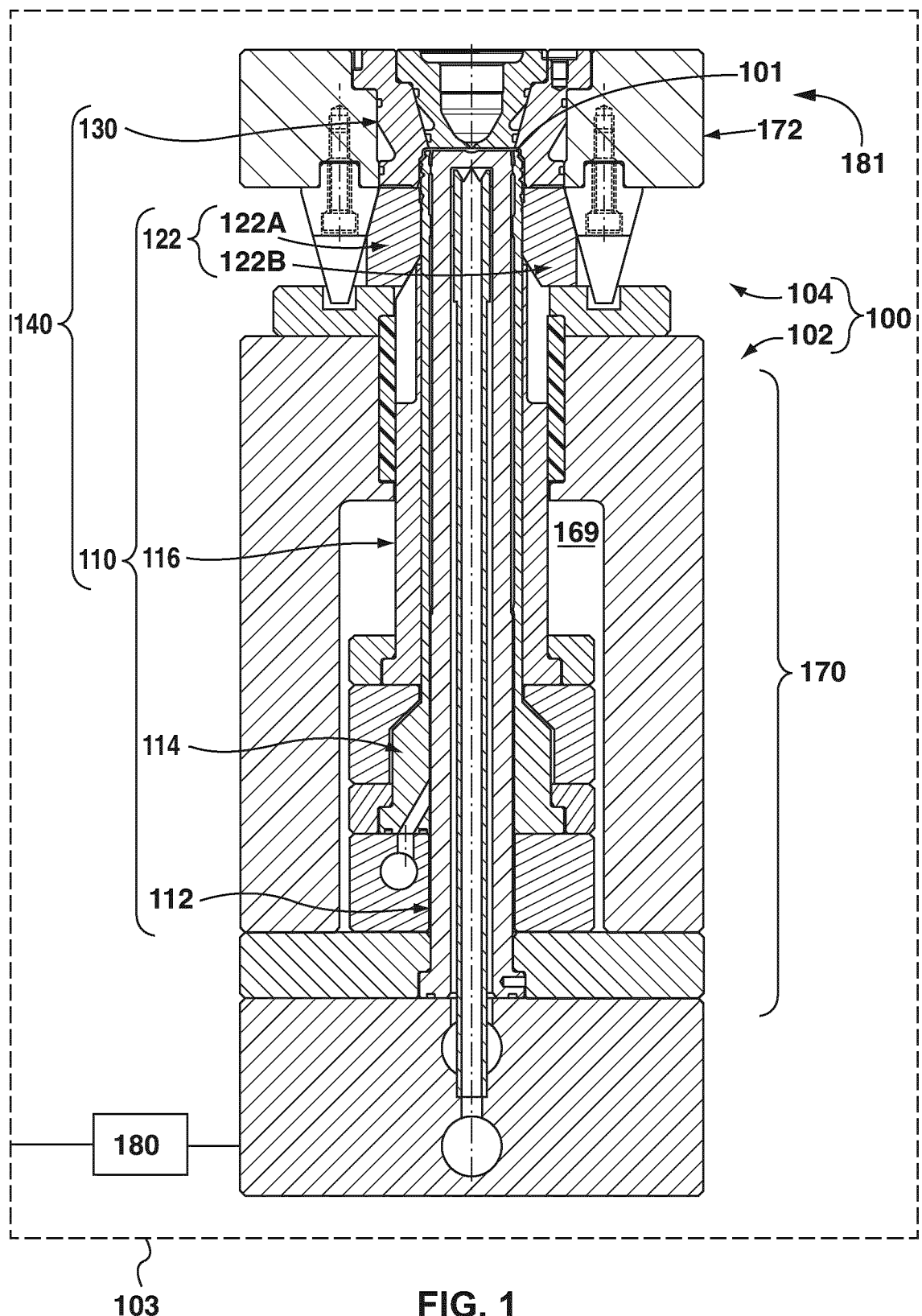
FIG. 1 shows a section view through a portion of a non-limiting embodiment of an injection mold and of a mold stack thereof, the injection mold being suitable for implementing non-limiting embodiments of the present technology.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF THE NON-LIMITING EMBODIMENT(S)

Reference will now be made in detail to various non-limiting implementations for controlling operation of a mold during a portion of a molding cycle of the mold, during which molding to cycle a molded article is produced. It should be understood that other non-limiting implementations, modifications and equivalents will be evident to one of ordinary skill in the art in view of the non-limiting implementations disclosed herein and that these variants should be considered to be within scope of the appended claims. Furthermore, it will be recognized by one of ordinary skill in the art that certain structural and operational details of the non-limiting implementations discussed hereafter may be modified or omitted (i.e. non-essential) altogether. In other instances, well known methods, procedures, and components have not been described in detail.

It is to be further expressly understood that the injection mold and its components are depicted merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the injection mold and/or its components may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the injection mold and/or its components may provide in certain instances simple implementations of the present technology, and that where such is the case they have been presented in this manner as an aid to understanding. As persons skilled in the art would understand, various implementations of the present technology may be of a greater complexity. Furthermore, where specific details of the different implementations are presented with reference to discrete implementations, a person skilled in the art is expected to combine specific implementational details of one discrete implementation with specific implementational details of another discrete implementation, even though such a combination may not be expressly disclosed herein below.

With reference to FIG. 1, there is depicted a section view through a portion of a non-limiting embodiment of a portion of an injection mold 100. The injection mold 100 can be positioned, in use, within a molding machine, which is schematically depicted in FIG. 1 at 103. The constructions of the molding machine 103 is well known to those of skill in the art and, as such, will not be described here at any length. Briefly, the molding machine 103 may include a clamping unit (not depicted), which can be implemented as a tie-bar based assembly, clamping column based assembly, a toggle-style clamp and the like. The molding machine 103 further includes an injection unit (not depicted) for plasticizing molding material. The injection unit can be of a single stage injection unit type or a two-stage injection unit type with a shooting pot (not depicted) and steps, to form the molded article.

The molding machine 103 further comprises a controller apparatus, which is depicted in FIG. 1 schematically at 180. The controller apparatus 180 can be implemented as a general purpose or a purpose-specific computing apparatus. Generally, the controller apparatus 180 has a human-machine interface (not depicted) to enable an operator to interface therewith.

The controller apparatus 180 is configured to control operation of one or more functions of the molding machine 103, including controlling some or all of: the injection mold 100, the clamping unit, the injection unit, as well as other components of the molding machine 103 (such as post-mold cooling units, auxiliary equipment, and the like, all of which are not depicted). In some embodiments, the molding machine 103 can have more than a single controller apparatus 180 and, as such, there can be several controller apparatuses 180 some of which are dedicated to controlling one or more specific components of the molding machine 103.

To that extent, the controller apparatus 180 can store (for example, in a non-transitory computer readable medium) or otherwise have access to machine-readable instructions, which machine readable instructions when executed can cause the controller apparatus 180 to execute various routines to be described herein below (as well as other control routines).

The injection mold 100 includes a moveable mold half 102 and a stationary mold half 104 that are associated, in use, with platens (not depicted) of the molding machine 103 for a repositioning thereof between a mold-closed configuration, as shown in FIG. 1, and a mold-open configuration. More specifically, the moveable mold half 102 is attached to a moving platen (not depicted) for movement therewith during the appropriate portions of the molding cycle as will be described below and the stationary mold half 104 is attached to a stationary platen (not depicted). The stationary mold half 104 can further include or be otherwise coupled to a hot runner (not depicted) as is very well know to those of skill in the art.

In the mold-closed configuration, a molding cavity 101 is defined in a mold stack 140 that is associated with the injection mold 100 within which a molded article (not depicted in FIG. 1), such as, for example, a closure of a type for capping a bottle, is moldable. Even though the injection mold 100 is described using an example of the molding cavity 101 configured to produce a closure for a beverage container, it should be understood that teachings provided herein are not so limited and can be applied to molds configured for production of other types of molded articles. As such, configuration of the injection mold 100 provided herein below is only used as an example for illustrating embodiments of the present technology.

In the mold-open configuration a first stack portion 110 and a second stack portion 130 of the mold stack 140, that are associated with the moveable mold half 102 and the stationary mold half 104, respectively, are separated to open the molding cavity 101 for a subsequent release of the molded article therefrom.

The non-limiting embodiment of the moveable mold half 102 broadly includes a first mold shoe 170 with which the first stack portion 110 is associated. More particularly, the first mold shoe 170 provides for coupling, in use, the first stack portion 110 to one of the platens (not shown) of the molding machine 103, as well as for repositioning members of the first stack portion 110 between a molding configuration and an ejection configuration.

The first stack portion 110 broadly includes an inner core 112, an outer core 114, and a slide pair 122 with which to define an inner portion and an encapsulated portion of the molding cavity 101. The first stack portion 110 also includes a stripper sleeve 116 with which to open the slide pair 122 and to strip the molded article 106 from the outer core 114.

The stripper sleeve 116 has a tubular body that is slidably arranged around the outer core 114 to accommodate a relative movement therebetween, along a mold-stroke axis (which can also be thought of as an "operational axis" of the injection mold 100), whereby the slide pair 122 are openable and the molded article 106 is strippable from the outer core 114. In the present non-limiting embodiment the stripper sleeve 116 does not define any portion of the molding cavity 101. That being said, in another non-limiting embodiment, not shown, the stripper sleeve 116 may have an alternative structure wherein it too defines a portion of the molding cavity 101 in keeping with common practice in the art.

Returning to the description of the present non-limiting embodiment, the stripper sleeve 116 is configured to engage a portion of the molded article to cause a stripping thereof from the outer core 114 with movement of the stripper sleeve 116 from a stripper sleeve molding position towards a stripping position by use of an ejector (not depicted), such as an ejector plate that can simultaneously actuate the stripper sleeve 116 as well as other stripper sleeves 116 potentially present within the configuration of the injection mold 100). The ejector plate can be actuated by known actuators (not depicted). The path of the ejector between the molding position and the stripping position is generally referred to as an ejector stroke from the molding position (as shown in FIG. 1) towards the ejection position.

For simplicity, the inner core 112 and the outer core 114 can be referred to, together, as a "molding component" of the moveable mold half 102.

As may have been appreciated already, the first slide 122A and the second slide 122B of the slide pair 122 are configured to define the encapsulated portion of a molding cavity 101 (which, in case of the molded article being the closure, is configured to mold a thread area, a tamper evident band area and the like) in cooperation with the inner core 112 and the outer core 114 when arranged in the first slide molding position and a second slide molding position, respectively. Both the first slide 122A and the second slide 122B are formed from a rectangular bar of material thus defining a bar body.

Having described the construction of the moveable mold half 102, the description shall now briefly focus on the stationary mold half 104. With reference to FIG. 1, it may be appreciated that the stationary mold half 104 broadly includes a second mold shoe 181 with which the second stack portion 130 is associated. More particularly, the second mold shoe 181 provides for coupling, in use, of the second stack portion 130 to a remaining one of the platens (not shown) of the molding machine 103. The second stack portion 130 also defines a hot runner receptacle (not numbered) for accepting, in use, a hot runner nozzle (not depicted).

The second mold shoe 181 includes a cavity plate 172. The cavity plate 172 is structured to have the second stack portion 130 mounted thereto. The second stack portion 130 is generally configured to mold an outer portion of the closure.

It should be noted that the description of the injection mold 100 has been greatly simplified for the sake of brevity. It is expected that those of skill in the art will be able to implement other components of the injection mold 100 not herein specifically described.

Without limiting the generality of the foregoing description of the operation of the controller apparatus 180, the controller apparatus 180 can execute the following control routines:

initiate opening the injection mold 100 with movement of the moveable mold half 102 through the mold stroke away from the stationary mold half 104 from a mold closed position (depicted in FIG. 1) towards a mold open position (in the orientation of FIG. 1, the mold stroke is in the vertical direction);

initiate movement of the ejector of the moveable mold half 102 through an ejector stroke from a molding position towards an ejection position relative to the moveable mold half 102;

control velocity of one of (i) the moveable mold half 102 relative to the stationary mold half 104, and (ii) the ejector relative to the moveable mold half 102.

Figure 2:
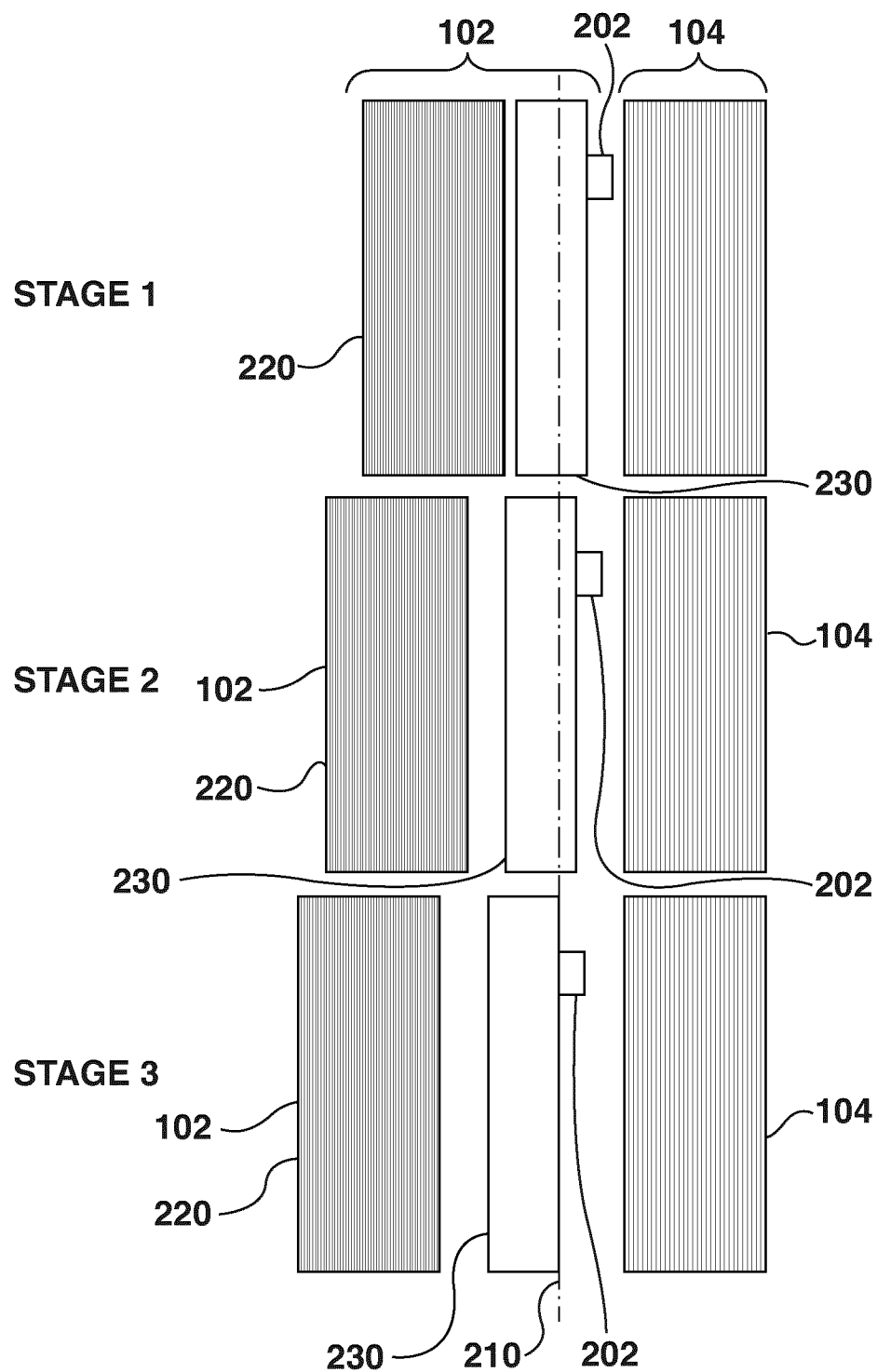
FIG. 2 depicts a moveable mold half, a stationary mold half and a molding component associated with the moveable mold half, all being part of the injection mold of FIG. 1 during various parts of the injection cycle.

Thus having described the structure of the non-limiting embodiment of the injection mold 100, the operation thereof shall now be briefly reviewed. The operation of the injection mold 100 will be explained from the perspective of an injection cycle associated with the injection mold 100. In order to simplify the illustration of what is to be presented below, the following simplified illustration will be used— with reference to FIG. 2. Depicted in FIG. 2 are the aforementioned moveable mold half 102, the stationary mold half 104 and a molding component 202 associated with the moveable mold half 102. The moveable mold half 102 schematically depicts a core plate 220 and an ejector 230 (such as an ejector plate, for example, which can be implemented, for example, as a plate actuating one or more of the stripper sleeves 116).

FIG. 2 depicts the moveable mold half 102, the stationary mold half 104 and the molding component 202 in three stages of the mold opening portion of the molding cycle—stage 1, stage 2 and stage 3.

A typical injection molding cycle involving the injection mold 100 begins with the injection mold 100 being in the mold-closed configuration (i.e. closed and clamped). This is the configuration depicted in FIG. 1

Injection Phase of the Injection Cycle

First, molding material is injected into the molding cavity 101, using known injection units (not depicted).

Cooling Phase of the Injection Cycle

The molded article is then solidified, at least partially, in the molding cavity 101 with the application of in-mold cooling, using known structure and steps. The molded article is cooled in the molding cavity 101 to a safe removal temperature, i.e. a pre-determined temperature where the molded article can be removed from within the molding cavity 101 without substantial structural defects thereto.

Ejection Phase of the Molding Cycle

Next, with the molded article having been cooled sufficiently to withstand opening of the injection mold 100 and stripping from the first stack portion 110 (and namely from the molding component 202) without causing a defect therein (i.e. undesired plastic deformation), the injection mold 100 is controlled into the mold-open configuration with relative separating movement of the moveable mold half 102 and the stationary mold half 104.

More specifically, the controller apparatus 180 causes the moveable mold half 102 to start moving through the mold stroke away from the stationary mold half 104 from the mold closed position towards the mold open position. This direction is downwards as viewed in the orientation of the depiction of FIG. 1 and left-wards as viewed in FIG. 2.

Furthermore, the mold stroke is along a first operational axis of the injection mold 100. In some embodiments, the first operations axis can be substantially horizontal. However, the operational axis can also be vertical.

As depicted in FIG. 2, during stage 1 of the mold opening portion of the molding cycle, the controller apparatus 180 controls the moveable mold half 102 away from the stationary mold half 104. During this portion of the mold opening cycle, the core plate 220 and the ejector 230 are moved together away from the stationary mold half 104.

Once the injection mold 100 has been sufficiently progressed towards the mold open configuration, the first stack portion 110 is controlled for the ejection of the molded article 106 therefrom. This is depicted at stage 2 of the mold opening portion of the molding cycle, where the ejector 230 is moved forward (i.e. towards the stationary mold half 104) and, more specifically, the stripper sleeve 116 is actuated towards the stationary mold half 104, whereas the core plate 220 continues to move away from the stationary mold half 104.

At the same time as moving the stripper sleeve 116 a first distance towards the stripping position and controlling the first slide 122A and the second slide 122B, to move them from the first and second slide molding positions to the first and second slide clearance positions, respectively.

In some embodiments of the present technology, the ejection of the molded article is executed at a pre-determined ejection position, which is depicted in FIG. 2 at 210. The pre-determined ejection position 210 is a position of the moveable mold half 102 during its mold stroke and the ejector during its ejector stroke where the molded article is to depart from the molding component 202. In some embodiments of the present technology, the controller apparatus 180 can acquire an indication of the pre-determined ejection position 210 by means of an operator of the molding machine entering the indication of the pre-determined ejection position 210 using a human-machine interface (not depicted) of the controller apparatus 180.

The operator can execute an iterative molding test run in order to determine such a pre-determined ejection position 210 when the moveable mold half 102 has moved away by a sufficient distance from the stationary mold half 104 to allow for safe molded article ejection process. In stage 3 of the mold opening cycle depicted in FIG. 2, the injection mold 100 is depicted where the pre-determined ejection position 210 has been reached.

As the components of the injection mold 100 are moving towards the pre-determined ejection position 210, the stripper sleeve 116 is actuated a further distance towards the stripping position with the stripper sleeve 116 being in contact with a bottom surface of the molded article.

During this stage, the outer core 114 is moved in tandem with the stripper sleeve 116, wherein the outer core 114 is moved relative to the inner core 112 to release the part (e.g. plug seal) of the molded that was encapsulated therebetween.

This step further involves moving the stripper sleeve 116 a final distance to the stripping position, with the outer core 114 held stationary, whereby the molded article is stripped from contact with the outer core 114, by virtue of being pushed therefrom by the stripper sleeve 116.

Once the molded article is stripped from the outer core 114, the molded article is removed from within the injection mold 100 by known techniques, such as by free-fall or any other suitable technique. The injection mold 100 is then controlled into the mold closed configuration and the injection cycle is repeated.

In accordance with embodiments of the present technology, during a first portion of the mold opening cycle of the injection mold 100 (as the moveable mold half 102 is moving towards the pre-determined position), the controller apparatus 180 executes the following control routines: (i) initiating opening the injection mold 100 with movement of the moveable mold half 102 through the mold stroke away from the stationary mold half 104 from a mold closed position towards a mold open position; (ii) initiating movement of the ejector of the moveable mold half 102 through the ejector stroke from the molding position towards the ejection position relative to the moveable mold half 102.

This control routine will be described in further detail with reference to FIGS. 3A-3C, which Figures schematically depict the injection mold 100 going through the mold opening portion of the molding cycle, akin to the illustration of FIG. 2.

Figure 3A:
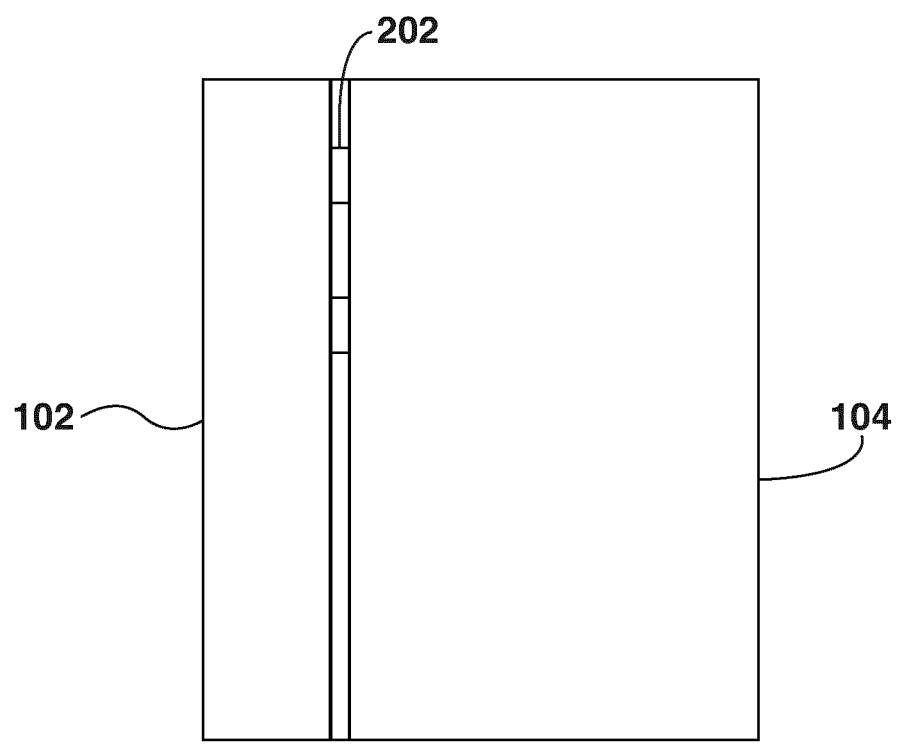
FIGS. 3A to 3C depict the injection mold of FIG. 1 during various stages of during a first portion of a mold opening cycle of a molding cycle.

FIG. 3A depicts the injection mold 100 in the mold closed configuration, where the moveable mold half 102 and the stationary mold half 104 are still clamped together at the end of the cooling portion of the molding cycle.

Figure 3B:
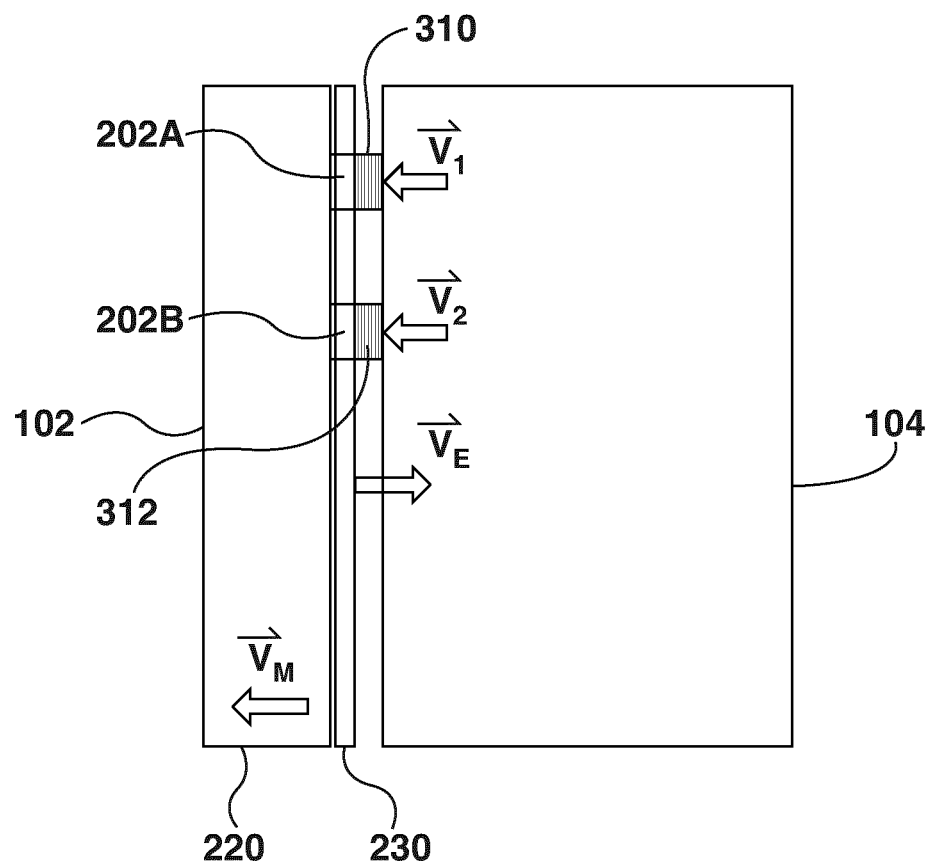

FIG. 3B depicts the moveable mold half 102 being moved away from the stationary mold half 104. There are also depicted a first mold component 202A and a second mold component 202B both associated with the moveable mold half 102. The first mold component 202A carries thereupon a first molded article 310 and the second mold component 202B carries thereupon a second molded article 312. As has been previously alluded to, the opening the injection mold 100 and moving the ejector 230 are being done along a first axis of operation of the injection mold 100 but in relatively opposite directions of movement. More specifically, the moveable mold half 102 is moved away from the stationary mold half 104, while the ejector 230 is moved towards the stationary mold half 104 (such that the above-mentioned stripper sleeve 116 is moved towards the stationary mold half 104 for assisting in stripping the molded article 310, 312 off the molding component 220A, 220B).

As the moveable mold half 102 is being moved away from the stationary mold half 104, the core plate 220 moves with a moveable mold half velocity Vm. The ejector 230 moves with an ejector velocity Ve. The first molded article 310 moves with a first molded article velocity V1 and the second molded article 312 moves with a second molded article velocity V2. In some implementations, the first molded article velocity V1 substantially equals the second molded article velocity V2 and they both substantially equal moveable mold half velocity Vm. However, due to practical stack-to-stack variations between the first mold component 202A and the second mold component 202B, the first molded article velocity V1 and the second molded article velocity V2 can be different.

Within the stage depicted in FIG. 3B, the moveable mold half velocity Vm does not necessarily match the ejector velocity Ve. In some embodiments of the present technology, during the first portion of the mold opening cycle, i.e. when the controller apparatus 180 executes (i) the initiating movement of the moveable mold half 102 (and, more specifically, the core plate 220) and (ii) initiating movement of the ejector 230, the controller apparatus 180 can control velocities of the core plate 220 and the ejector 230 independently from each other. In some further embodiments, the controller apparatus 180 during the first portion of the mold opening cycle controls the velocities of the core plate 220 and the ejector 230 such that to minimize an overall mold opening time during the mold opening portion of the cycle of the injection mold 100 (i.e. time that elapses between commencement of the mold opening procedure and time when the molded article 310, 312 (as well as other molded articles produced using the injection mold 100) have been removed from within the injection mold 100 and the injection mold 100 can be closed again for execution of the next molding cycle.

Figure 3C:
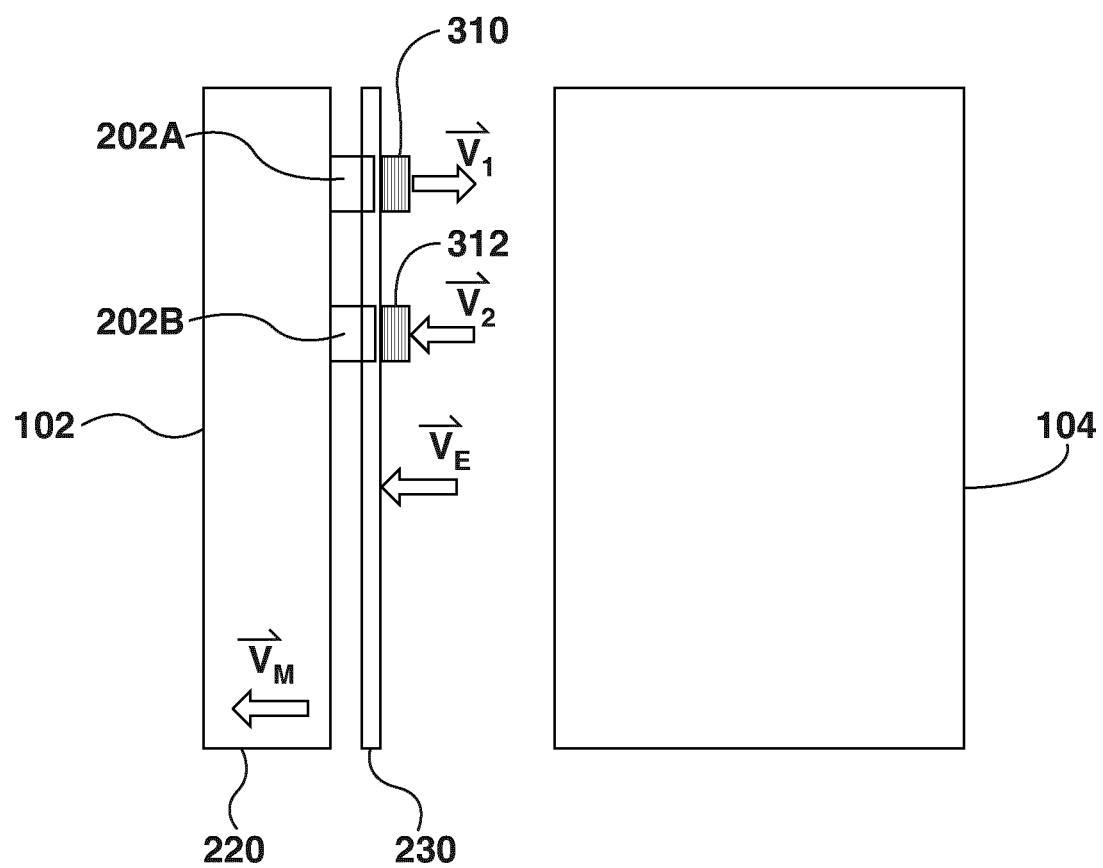

With reference to FIG. 3C, the injection mold 100 is depicted as approaching a second portion of the mold opening cycle of the mold (the second portion occurring later in time relative to the first portion of the mold opening cycle of the mold). During this second portion of the mold opening cycle, the controller apparatus 180 is configured to execute: controlling velocity of one of (i) the moveable mold half 102 (and, more specifically, the core plate 220) relative to the stationary mold half 104, and (ii) the ejector 230 relative to the core plate 220, the controlling executed such that the molded article 310, 312 is ejected from the molding component 220A, 220B with a substantially zero departure-velocity along the first axis of operation. According to embodiments of the present technology, execution of the second portion is triggered by the controller apparatus 180 at a predetermined portion of the mold opening cycle. The predetermined portion of the mold opening cycle is a portion of the mold opening cycle when the molded article 310, 312 is at a final contact point with the molding component 220A, 220B.

In those embodiments where the molded article 310, 312 is a closure having a threaded portion, the final contact point of the molded article 310, 312 with the molding component 220A, 220B occurs when the stripper sleeve 116 clears the threaded portion of the closure. Alternatively, where the closure also has a tamper evident band (TEB), the final contact point of the molded article 310, 312 with the molding component 220A, 220B occurs when the molding component 220A, 220B engages only the TEB of the closure to the exclusion of other portions of the closure. Naturally, in those embodiments where the molded article 310, 312 is implemented as a different molded article, the final contact point of the molded article 310, 312 with the molding component 220A, 220B can be defined differently.

How the controller apparatus 180 executes the controlling of the velocity of one of (i) the moveable mold half 102 (and, more specifically, the core plate 220) relative to the stationary mold half 104, and (ii) the ejector 230 relative to the moveable mold half 102 (and, more specifically, the core plate 220) will now be explained in greater detail.

Where the injection mold 100 is configured to produce a plurality of molded articles 310, 312, the controller apparatus 180 is configured to execute controlling velocity such that the plurality of molded article 310, 312 are ejected from the injection mold 100 substantially only in a direction that is substantially perpendicular to the first axis of operation of the injection mold 100. In other words, where the first axis of operation is a horizontal axis, the aim is to ensure that the plurality of molded articles 310, 312 are ejected from the injection mold 100 substantially only in a vertical direction with substantially near-zero velocity in the horizontal direction. That, in turn, can have a technical effect of none of the plurality of molded article 310, 312 hitting the stationary mold half 104 during the ejection procedure. Another technical effect can include a comparatively faster molded article ejection process.

In some embodiments of the present technology, matching velocity comprises controlling at least one of (i) the opening speed of the moveable mold half 102 (and, more specifically, the core plate 220) and (ii) the speed of the ejector 230.

In some embodiments of the present technology, the controller apparatus 180 can further receive, from an operator of the mold, an indication of a pre-determined ejection position (i.e. the pre-determined ejection position 210), the pre-determined ejection position being associated with a position of the moveable mold half 102 during its mold stroke and the ejector 230 during its ejector stroke where the molded article 310, 312 is to depart from the molding component 220A, 220B, the controlling velocity can be executed by means of: commencing execution of controlling velocity at a pre-determined position before the predetermined ejection position. In some embodiments, the controller apparatus 180 can start executing the controlling velocity by delaying starting an ejector profile execution (the ejector profile being stored by the controller apparatus 180).

In some embodiments of the present technology, where the molded article 310, 312 is one of a plurality of molded articles 310, 312 that are moldable in the injection mold 100, the controller apparatus 180 can execute matching velocity by matching at least one of: (a) velocity of the moveable mold half 102 and (b) velocity of the ejector 230 to an average departure-velocity of the plurality of molded articles 310, 312. The average departure-velocity of the plurality of molded articles 310, 312 can be determined empirically by the operator of the injection mold 100.

In some embodiments of the present technology, where the molded article 310, 312 is one of a plurality of molded articles 310, 312 that are moldable in the injection mold 100, the controller apparatus 180 can execute matching velocity by matching at least one of: (a) velocity of the moveable mold half 102 and (b) velocity of the ejector 230 to a departure-velocity of a slowest one of the plurality of molded articles 310, 312. The slowest one of the plurality of molded articles 310, 312 can be determined empirically by the operator of the injection mold 100.

In some embodiments of the present technology, where the molded article 310, 312 is one of a plurality of molded articles 310, 312 that are moldable in the injection mold 100, the controller apparatus 180 can execute matching velocity by matching at least one of: (a) velocity of the moveable mold half 102 and (b) velocity of the ejector 230 such that to minimize velocity differential between a first departure-velocity of a slowest molded article 310, 312 and a second departure-velocity of a fastest molded article 310, 312, the first departure-velocity and the second departure-velocity being along the first axis of operation of the injection mold 100.

In some embodiments, the controller apparatus 180 executed matching velocity only during the second portion of the mold opening cycle of the mold (i.e. the portion of the mold opening cycle where the molded article 310, 312 is about to lose contact with the molding component 220A, 220B. In other embodiments, the controller apparatus 180 executes matching velocities a first pre-determined period of time before the predetermined portion of the mold opening cycle and continues for a second pre-determined period of time after the predetermined portion of the mold opening cycle. Both the first pre-determined period of time and the second pre-determined period of time can be determined empirically by the operator of the injection mold 100.

In some embodiments of the present technology, the controller apparatus 180 can execute matching velocity by matching at least one of: (a) velocity of the moveable mold half 102 and (b) velocity of the ejector 230 as follows. First, the controller apparatus 180 can calculate the time for the molded articles 310, 312 to drop out of mold area. This can be determined based on a height of the injection mold 100.

The controller apparatus 180 then determines the speed of the ejector 230 at the part stripped off position (i.e. at the pre-determined ejection position 210) based on data from a previous molding cycle.

The controller apparatus 180 then optimizes the mold open motion profile to open the injection mold 100 at the pre-determined ejection position 210 with a shortest time to match the moveable mold half 102 speed with the ejector 230 speed (so that the molded articles 310, 312 have zero departure-velocity with reference to the molding machine 103 base. The controller apparatus 180 can then open the injection mold 100 to the full mold open position and then actuate the injection mold 100 to the pre-determined ejection position 210 in such a time interval such that the molded articles 310, 312 just have enough time to clear the mold area. By executing such a process, the controller apparatus 180 acquires both time and energy associated with the suggested optimized mold open position.

The controller apparatus 180 then close the injection mold 100 to the fully closed position to determine the shortest possible time.

Therefore, in some embodiments of the present technology, the ejector 230 can be said to be a "master" at the pre-determined ejection position 210. Mold stroke can be said to be a 'slave' and the controller apparatus 180 aims to match the mold stroke and the ejector 230 speed at the pre-determined ejection position 210. On the other hand, the mold stroke can be the 'master' to optimize the cycle motion time and stroke energy.

With reference to FIG. 3C, the injection mold 100 is depicted a point of time after the controller apparatus 180 has completed controlling velocity of one of (i) the moveable mold half 102 (and, more specifically, the core plate 220) relative to the stationary mold half 104, and (ii) the ejector 230 relative to the moveable mold half 102 (and, more specifically, the core plate 220). At this point in time, the first molded article 310 and the second molded article 312 have departed the associated molding component 220A, 220B.

As can be seen in FIG. 3C, the first molded article 310 has a first departure-velocity V1 and the second molded article 312 has a second departure-velocity V2. Due to the stack-to-stack variations, the value and even the direction of the first departure-velocity V1 and the second departure-velocity V2 can vary. Naturally, the value and even the direction of the first departure-velocity V1 and the second departure-velocity V2 can be substantially the same.

However, the technical result of embodiments of the present technology, is that the first departure-velocity V1 and the second departure-velocity V2 are substantially close to the zero departure-velocity in the operational axis of the injection mold 100.

Therefore, the plurality of molded article 310, 312 are ejected from the injection mold 100 substantially only in a direction that is substantially perpendicular to the first axis of operation of the injection mold 100. In other words, where the first axis of operation is a horizontal axis, the plurality of molded articles 310, 312 are ejected from the injection mold 100 substantially only in a vertical direction with substantially near-zero velocity in the horizontal direction.

It should be noted that the various actuators described herein can be implemented as machine-based actuators or mold-based actuators. It is further noted that not all the actuators need to be implemented the same way—some actuators can be machine-based and others can be mold-based.

Figure 4:
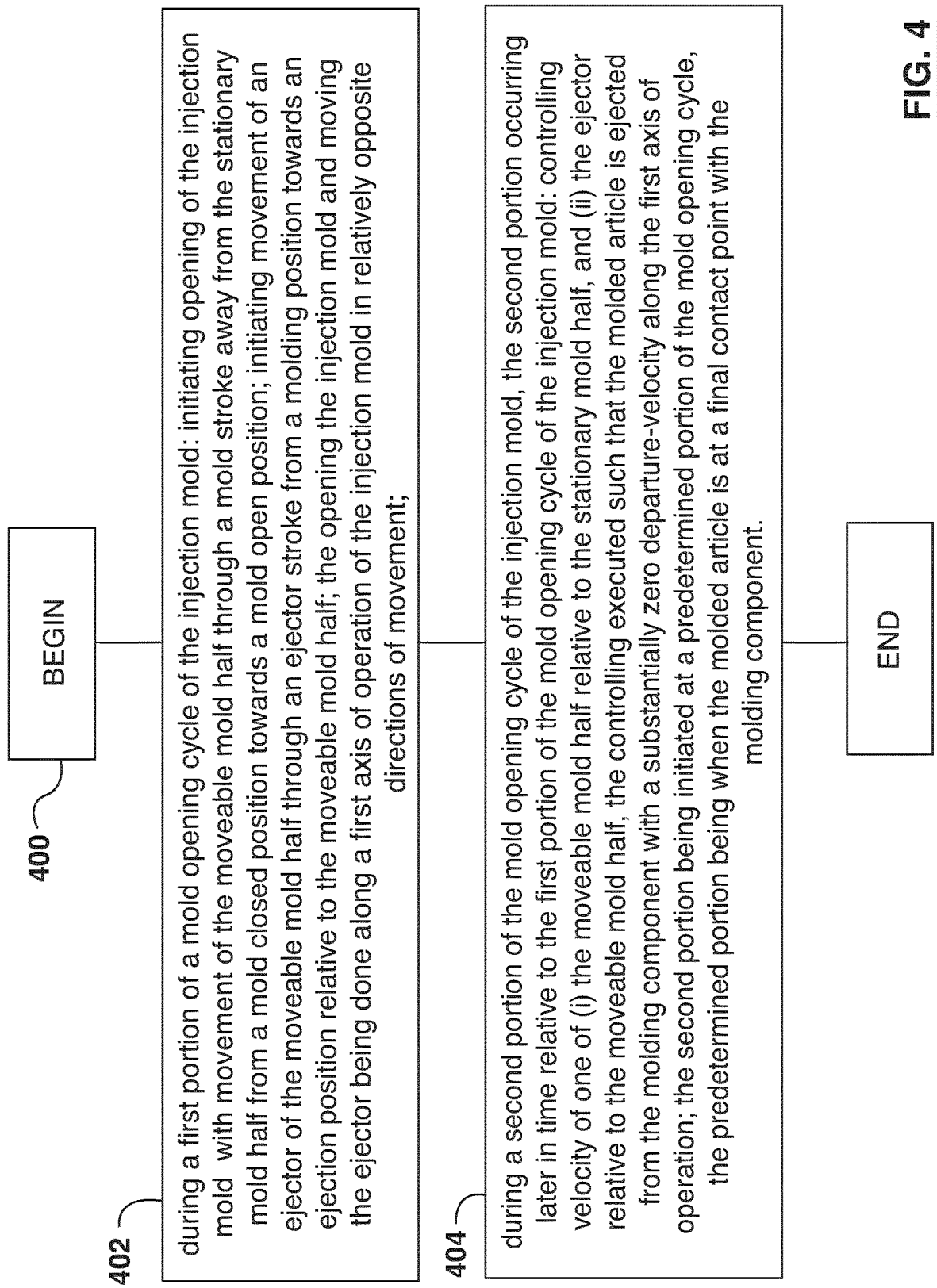
FIG. 4 depicts a block diagram of a method for ejecting a molded article, the method executed in accordance with non-limiting embodiments of the present technology.

Given the architecture of the injection mold 100 described above, the controller apparatus 180 is configured to execute a method of ejecting the molded article 310, 312 from the injection mold 100, the injection mold 100 including the stationary mold half 102 and the movable half 104, the moveable mold half 102 further including the molding component 220A, 220B for defining, in use, at least a portion of the molded article 310, 312, the injection mold 100 configured to be used in the molding machine 103, the molding machine 103 having the controller apparatus 180. With reference to FIG. 4, there is depicted a flow chart of a non-limiting embodiment of a method 400, the method 400 being executed in accordance with embodiments of the present technology. The method 400 can executable by the controller apparatus 180.

Step 402—during a first portion of a mold opening cycle of the mold: initiating opening the mold with movement of the moveable mold half through a mold stroke away from the stationary mold half from a mold closed position towards a mold open position; initiating movement of an ejector of the moveable mold half through an ejector stroke from a molding position towards an ejection position relative to the moveable mold half; the opening the mold and moving the ejector being done along a first axis of operation of the mold in relatively opposite directions of movement.

The method 400 begins at step 402, where the controller apparatus 180, during the first portion of the mold opening cycle of the injection mold 100 (as the moveable mold half 102 is moving towards the pre-determined position), executes the following control routines: (i) initiating opening the injection mold 100 with movement of the moveable mold half 102 (and, more specifically, the core plate 220) through the mold stroke away from the stationary mold half 104 from a mold closed position towards a mold open position; (ii) initiating movement of the ejector of the moveable mold half 102 through the ejector stroke from the molding position towards the ejection position relative to the moveable mold half 102.

Step 402—during a second portion of the mold opening cycle of the mold, the second portion occurring later in time relative to the first portion of the mold opening cycle of the mold: controlling velocity of one of (i) the moveable mold half relative to the stationary mold half, and (ii) the ejector relative to the moveable mold half, the controlling executed such that the molded article is ejected from the molding component with a substantially zero departure-velocity along the first axis of operation; the second portion being initiated at a predetermined portion of the mold opening cycle, the predetermined portion being when the molded article is at a final contact point with the molding component.

Next, at step 402, during the second portion of the mold opening cycle, the controller apparatus 180 is configured to execute: controlling velocity of one of (i) the moveable mold half 102 (and, more specifically, the core plate 220) relative to the stationary mold half 104, and (ii) the ejector 230 relative to the moveable mold half 102 (and, more specifically, the core plate 220), the controlling executed such that the molded article is ejected from the molding component with a substantially zero departure-velocity along the first axis of operation. According to embodiments of the present technology, execution of the second portion is triggered by the controller apparatus 180 at a predetermined portion of the mold opening cycle. The predetermined portion of the mold opening cycle is a portion of the mold opening cycle when the molded article 310, 312 is at a final contact point with the molding component 220A, 220B. The method 400 can be repeated with each molding cycle of the injection mold 100.

Figure 5:
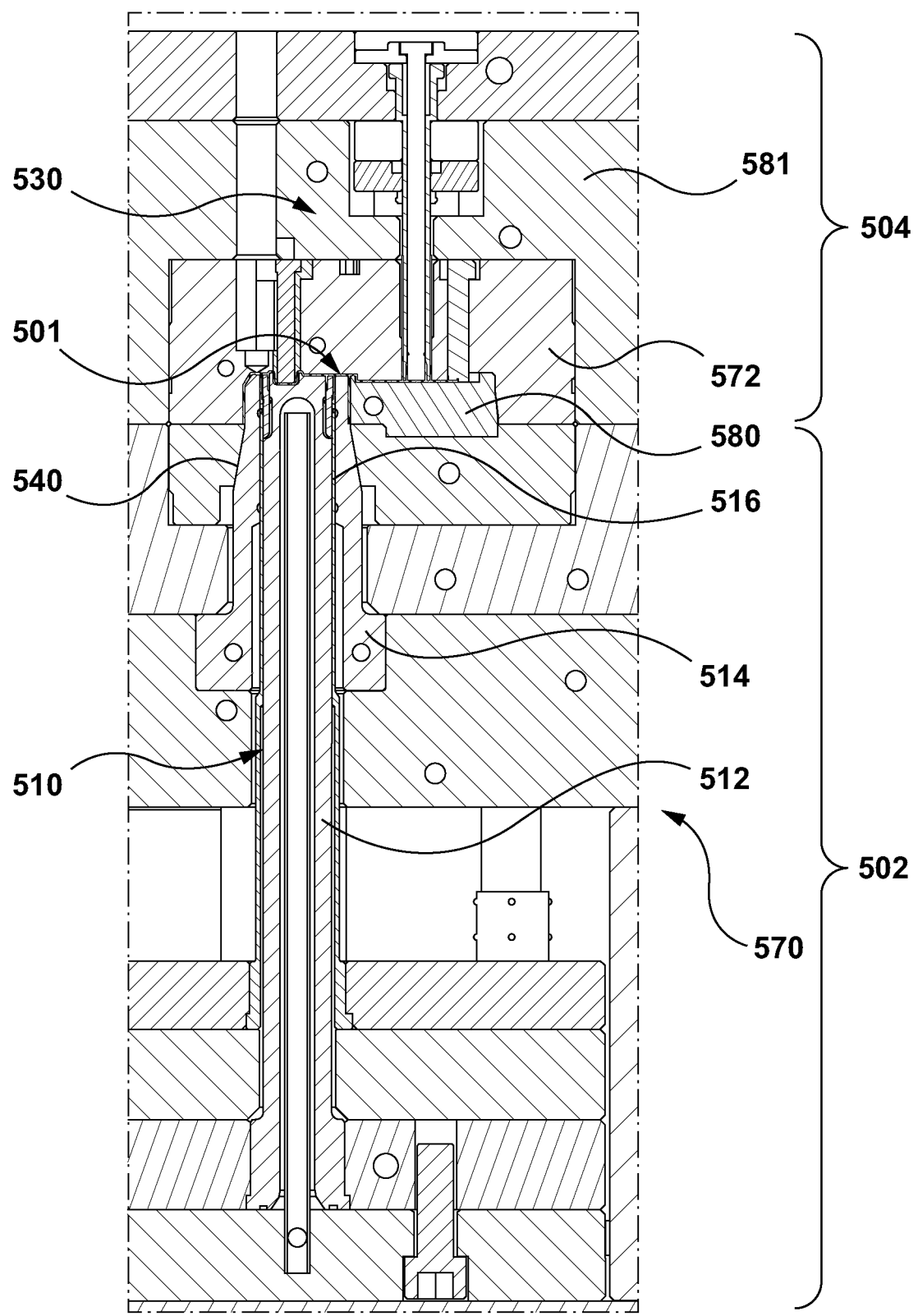
FIG. 5 depicts a section view through a portion of another non-limiting embodiment of a portion of an injection mold.

With reference to FIG. 5, there is depicted a section view through a portion of another non-limiting embodiment of a portion of an injection mold 500. The injection mold 500 can be positioned, in use, within the molding machine, which was schematically depicted in FIG. 1 at 103.

The injection mold 500 includes a moveable mold half 502 and a stationary mold half 504 that are associated, in use, with platens (not depicted) of the molding machine 103 for a repositioning thereof between a mold-closed configuration, as shown in FIG. 5, and a mold-open configuration (not depicted).

More specifically, the moveable mold half 502 can be attached to a moving platen (not depicted) for movement therewith during the appropriate portions of the molding cycle as will be described below and the stationary mold half 504 can be attached to a stationary platen (not depicted). The stationary mold half 504 can further include or be otherwise coupled to a hot runner (not depicted) as is very well know to those of skill in the art.

In the mold-closed configuration (as depicted in FIG. 5), a molding cavity 501 is defined in a mold stack 540 that is associated with the injection mold 500 within which a molded article 506 (numbered in FIG. 6, for example) is moldable. Within the illustration of FIG. 5, the molded article so moldable is a flip-top closure, typically used for sports beverages, personal care products and the like. A typical flip top closure comprises a base portion, a flip top portion and hinge connecting the two (all not numbered in FIG. 5). The base portion comprises an internal thread for engagement with a container that the flip top closure is to be used for. As will be described in greater detail herein below, the flip top closure is typically molded in an "open" configuration and is folded into a closed configuration before being ejected form within the injection mold 500.

In the mold-open configuration a first stack portion 510 and a second stack portion 530 of the mold stack 540, that are associated with the moveable mold half 502 and the stationary mold half 504, respectively, are separated to open the molding cavity 501 for a subsequent release of the molded article therefrom.

The non-limiting embodiment of the moveable mold half 502 broadly includes a first mold shoe 570 with which the first stack portion 510 is associated. More particularly, the first mold shoe 570 provides for coupling, in use, the first stack portion 510 to the moving platen (not shown) of the molding machine 103, as well as for repositioning members of the first stack portion 110 between a molding configuration and an ejection configuration.

Since the molded article produced in the molding cavity 501 is a flip top closure, the mold stack 540 is implemented differently from the mold stack 140. Since the flip top closure includes a base portion, a flip top portion and hinge connecting the two (all not numbered in FIG. 5), the mold stack 540 is structured and configured to mold the various portions of the flip top closure.

To that end, the first stack portion 510 broadly includes an inner core 512, an outer core 514. The inner core 512 and the outer core 514 cooperate to define an inner portion and an encapsulated portion(s) of the molded article 506. The first stack portion 510 also includes a stripper sleeve 516, which assists in stripping the molded article 506 from the outer core 514. As has been briefly alluded to above, it is noted that in some embodiments of the present technology, including the one depicted in FIG. 5, the stripper sleeve 516 can define a portion of the molded article 506 (such as a bottom surface of a plug seal of the molded article 506).

As with the embodiments described above, the movement of the stripper sleeve 516 from a stripper sleeve molding position towards a stripping position is executed by use of an ejector (not depicted), such as an ejector plate that can simultaneously actuate the stripper sleeve 516 as well as other stripper sleeves 516 potentially present within the configuration of the injection mold 500). The ejector plate can be actuated by known actuators (not depicted). The path of the ejector between the molding position and the stripping position is generally referred to as an ejector stroke from the molding position (as shown in FIG. 5) towards the ejection position.

For simplicity, the inner core 512 and the outer core 514 can be referred to, together, as a "molding component" of the moveable mold half 502.

The stripper sleeve 516 has a tubular body that is slidably arranged around the inner core 512 (and, more specifically, located in-between the inner core 512 and the outer core 514) to accommodate a relative movement therebetween, along a mold-stroke axis (which can also be thought of as an "operational axis" of the injection mold 500), whereby the molded article 506 is strippable from the inner core 512 by a relative repositioning of the stripper sleeve 516 and the outer core 514/inner core 512.

Within the embodiment depicted in FIG. 5, the moveable mold half 502 further includes a secondary cavity insert 580 for molding an outer surface of the flip top portion of the molded article 506.

Having described the construction of the moveable mold half 502, the description shall now briefly focus on the stationary mold half 504. With reference to FIG. 5, it may be appreciated that the stationary mold half 504 broadly includes a second mold shoe 581 with which the second stack portion 530 is associated. More particularly, the second mold shoe 581 provides for coupling, in use, of the second stack portion 530 to a remaining one of the platens (not shown) of the molding machine 503. The second stack portion 530 also defines a hot runner receptacle (not numbered) for accepting, in use, a hot runner nozzle (not depicted).

The second mold shoe 581 includes a cavity plate 572. The cavity plate 572 is structured to have the second stack portion 530 mounted thereto. In the depicted embodiment of FIG. 5, the second stack portion 530 is generally configured to mold an outer portion of the molded article 506 (the outer portion of the base portion of the flip-top closure), as well as an inner portion of the flip top portion.

It should be noted that the description of the injection mold 500 has been greatly simplified for the sake of brevity. It is expected that those of skill in the art will be able to implement other components of the injection mold 500 not herein specifically described.

With reference to FIGS. 6 to 16, which depict a cross section of a portion of the injection mold 500 through a sequence of phases of the molding cycle, the injection sequence within the context of the embodiment of the injection mold 500 of FIG. 5 will now be described in greater detail. In the FIGS. 6 to 16, there is depicted a portion of the first mold shoe 570 with a portion of the first stack portion 510 and a portion of the second mold shoe 581 with a portion of the second stack portion 530.

Figure 6:
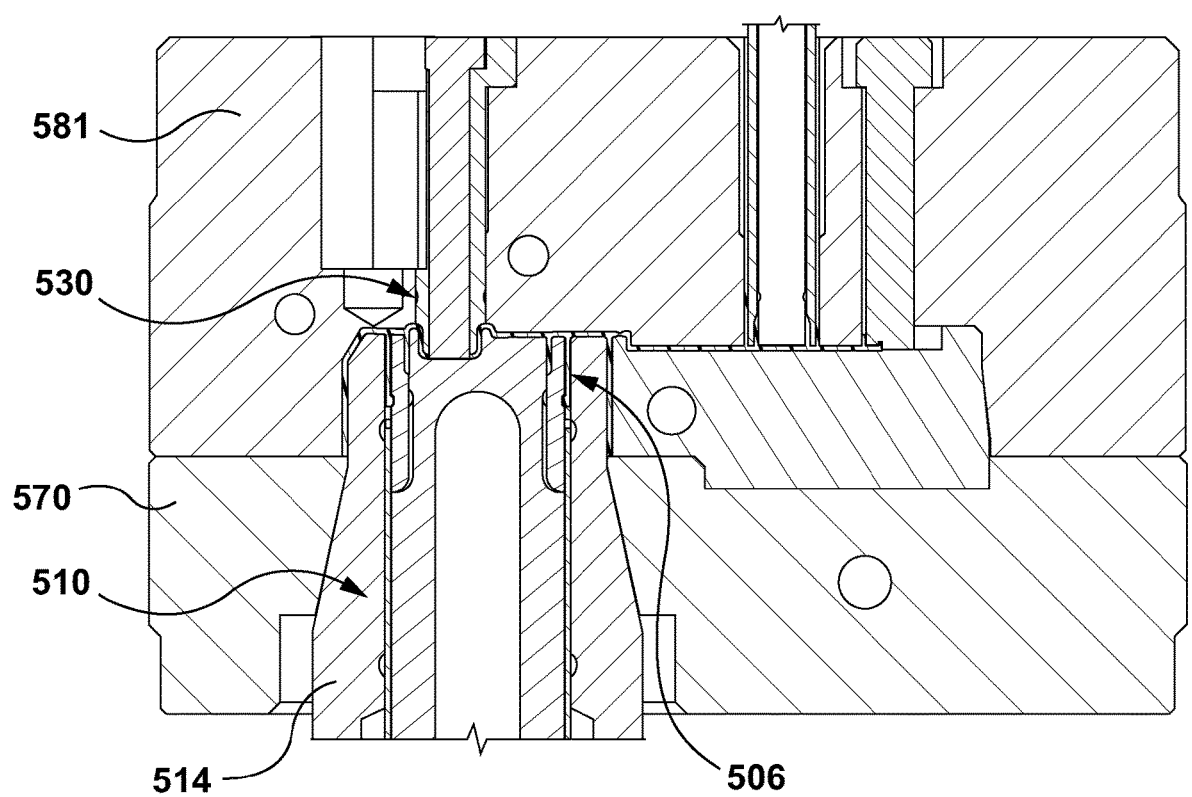
FIG. 6 depicts a section view of a first stack portion and a second stack portion of the injection mold of FIG. 5 in a mold closed configuration right after the in-mold cooling cycle of the molded article has been completed.

FIG. 6 depicts the first stack portion 510 and the second stack portion 530 in a mold closed configuration right after the in-mold cooling cycle of the molded article 506 has been completed. In other words, at a point of time when the molded article 506 has reached a safe ejection temperature, where the molded article 506 can be demolded without imparting defects (i.e. undesired plastic deformation) thereupon.

Figure 7:
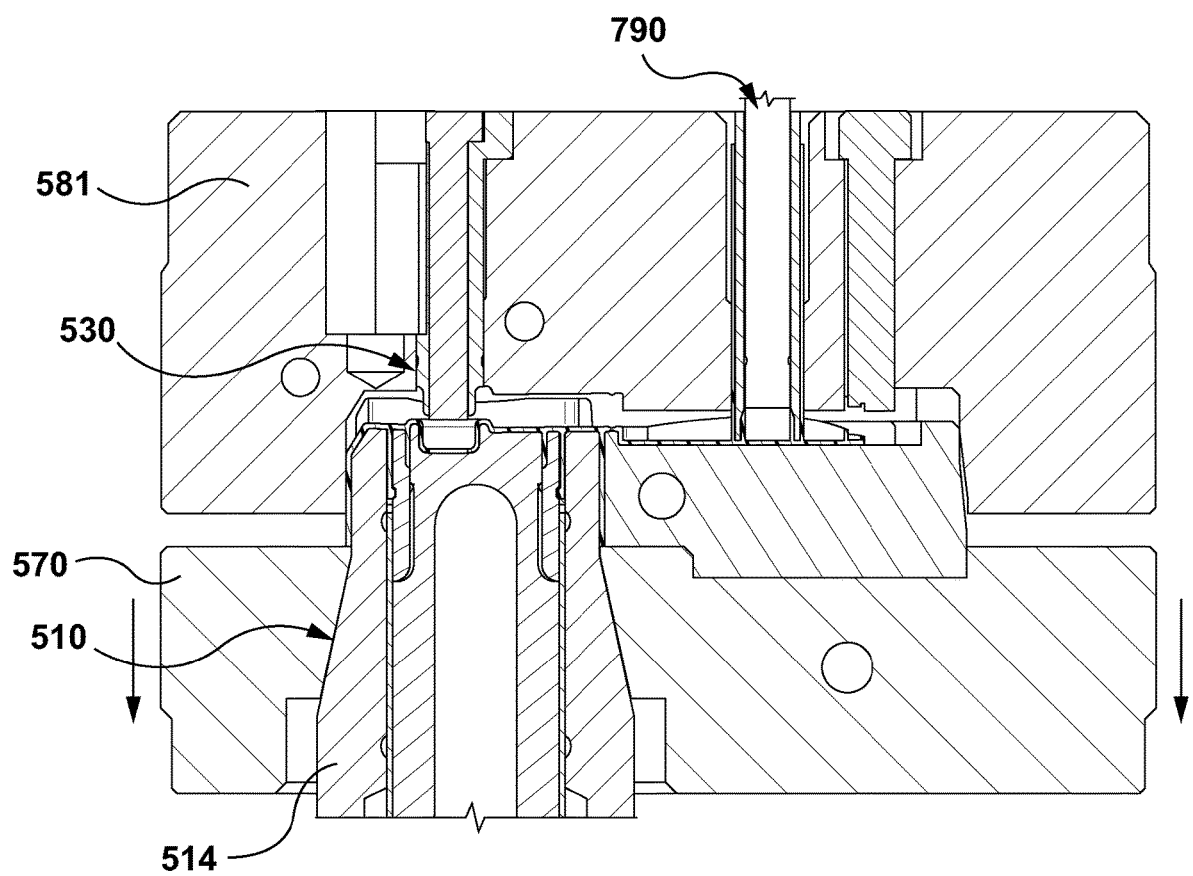
FIG. 7 depicts the first stack portion and the second stack portion of FIG. 6 at an initial stage of a mold opening.

FIG. 7 depicts the first stack portion 510 and the second stack portion 530 at an initial stage of a mold opening where the first mold shoe 570 is actuated away from the second mold shoe 581 to urge the first stack portion 510 away from the second stack portion 530 along the operational axis of the injection mold 500 (the direction of movement being depicted with an arrow in FIG. 7). In some embodiments of the present technology an auxiliary ejector 790 is actuated using a pneumatic actuator (not depicted) or the like to promote the flip top portion of the molded article 506 to stay and move in tandem with the secondary cavity insert 580 for traveling therewith along the operational axis of the injection mold 500.

Figure 8:
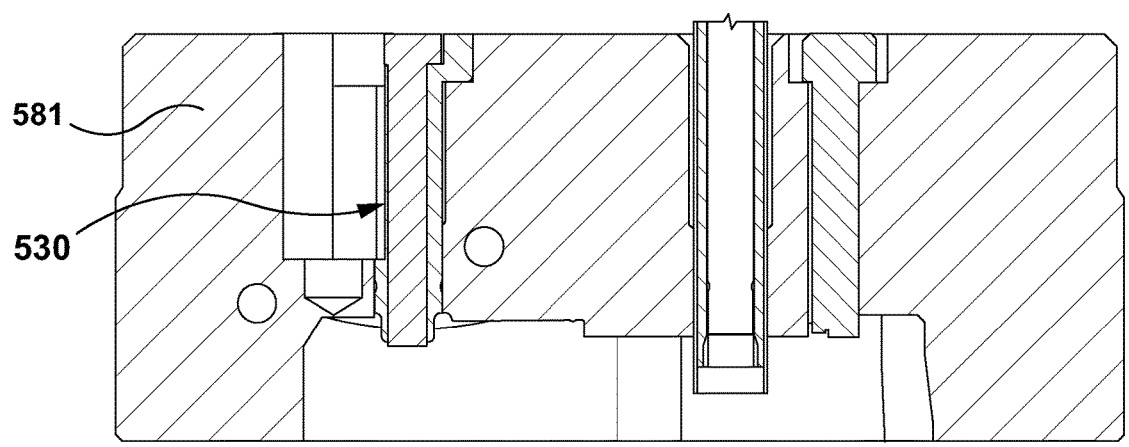
FIG. 8 depicts the first stack portion and the second stack portion of FIG. 6 at another stage of the mold opening.
Figure 8:
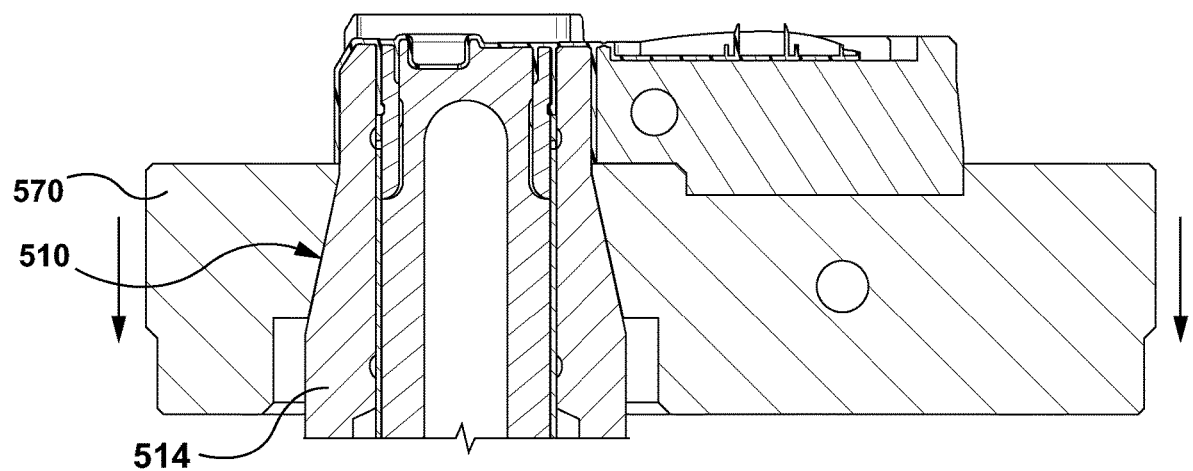

FIG. 8 depicts the first stack portion 510 and the second stack portion 530 at another stage of the mold opening where the first mold shoe 570 continues to be actuated away from the second mold shoe 581 to urge the first stack portion 510 further away from the second stack portion 530 along the operational axis of the injection mold 500 (depicted with an arrow in FIG. 8).

Figure 9:
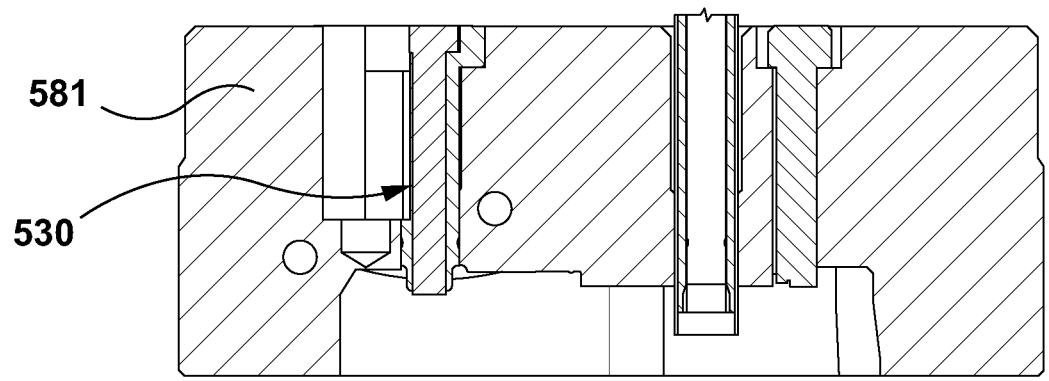
FIG. 9 depicts the first stack portion and the second stack portion at a final stage of the mold opening.
Figure 9:
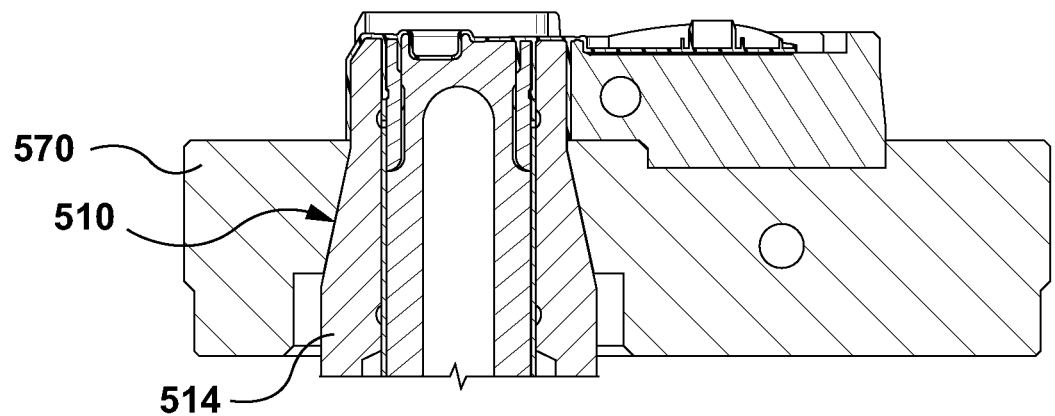

FIG. 9 depicts the first stack portion 510 and the second stack portion 530 at a final stage of the mold opening where the first mold shoe 570 has been separated away from the second mold shoe 581 to a complete mold open position. The opening distance to the complete mold open position is determined by several facts and can be easily selected by those operating the molding machine 103.

Figure 10:
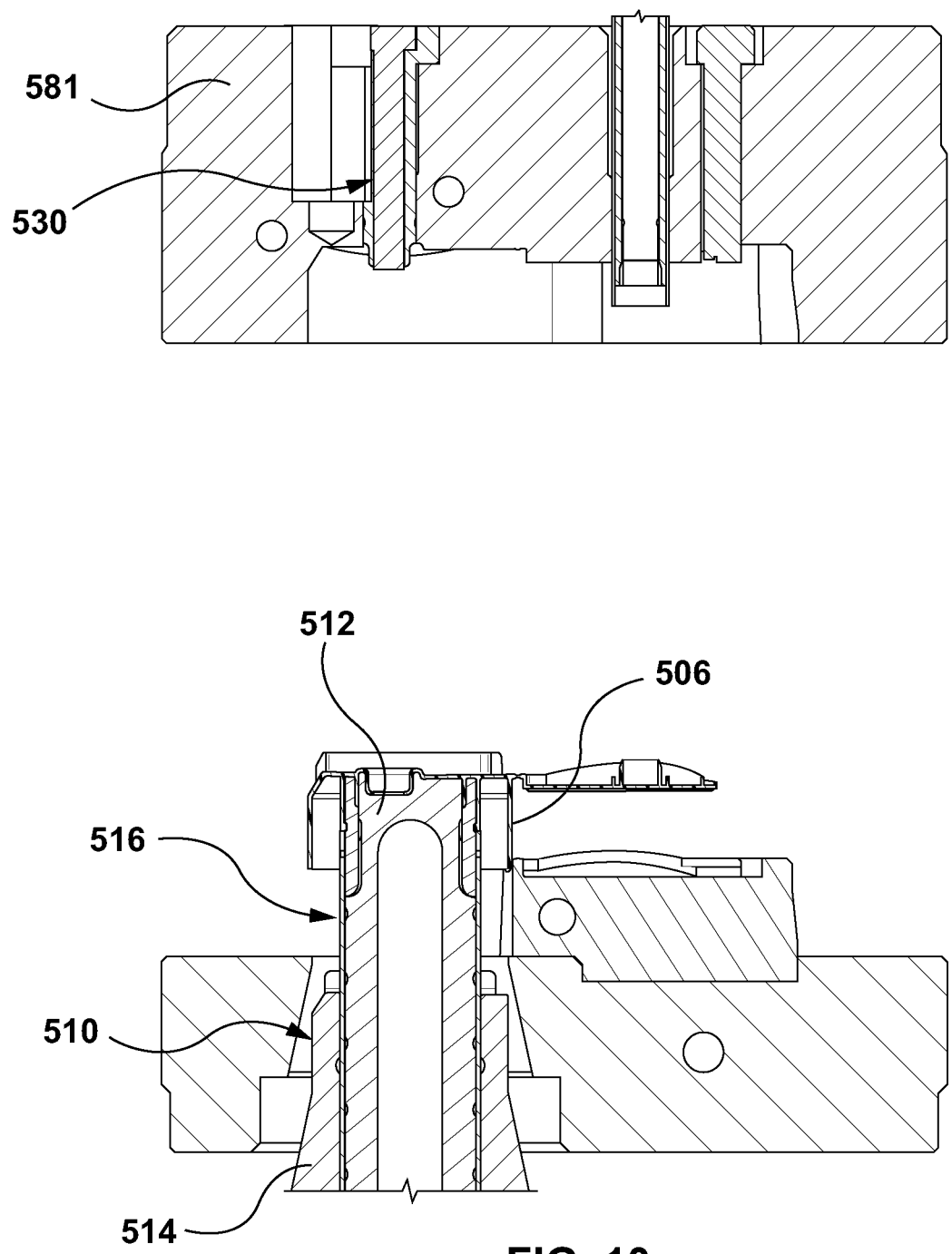
FIG. 10 depicts the first stack portion and the second stack portion at an initial portion of the ejection phase of the molded article.

FIG. 10 depicts the first stack portion 510 and the second stack portion 530 at an initial portion of the ejection phase of the molded article 506. The outer core 514 has been actuated relative to the inner core 512 and stripper sleeve 516 (in a direction away from the second stack portion 530 to clear the undercuts of the inside of the base portion of the molded article 506 (such as, but not limited to, a plug seal or the like). To that end, the outer core 514 is coupled to an ejector actuator (not depicted) for actuation thereof from a molding configuration to an ejection configuration.

The inner core 512 and the stripper sleeve 516 are actuated in a direction towards the second stack portion 530 with the molded article 506 positioned thereupon (with the flip top portion travelling with the remainder of the molded article 506 due to it being connected via the hinge).

Figure 11:
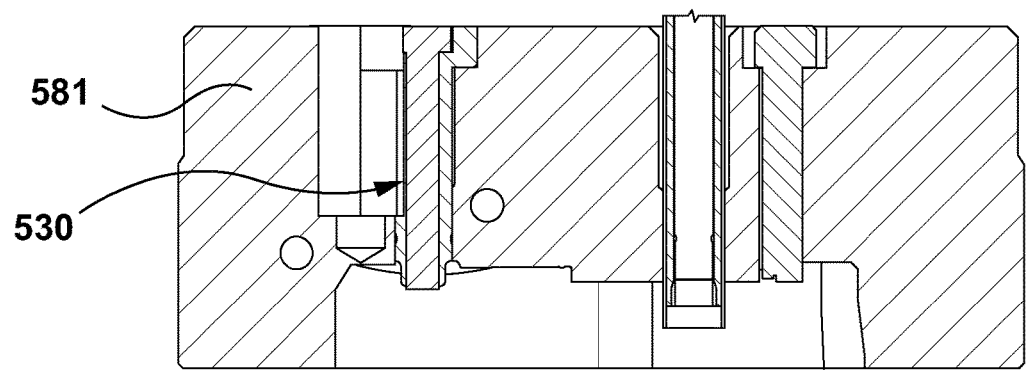
FIG. 11 to FIG. 14 depict the first stack portion and the second stack portion during a flip top portion closing process, with a lid closing device used for closing the flip top portion.
Figure 11:
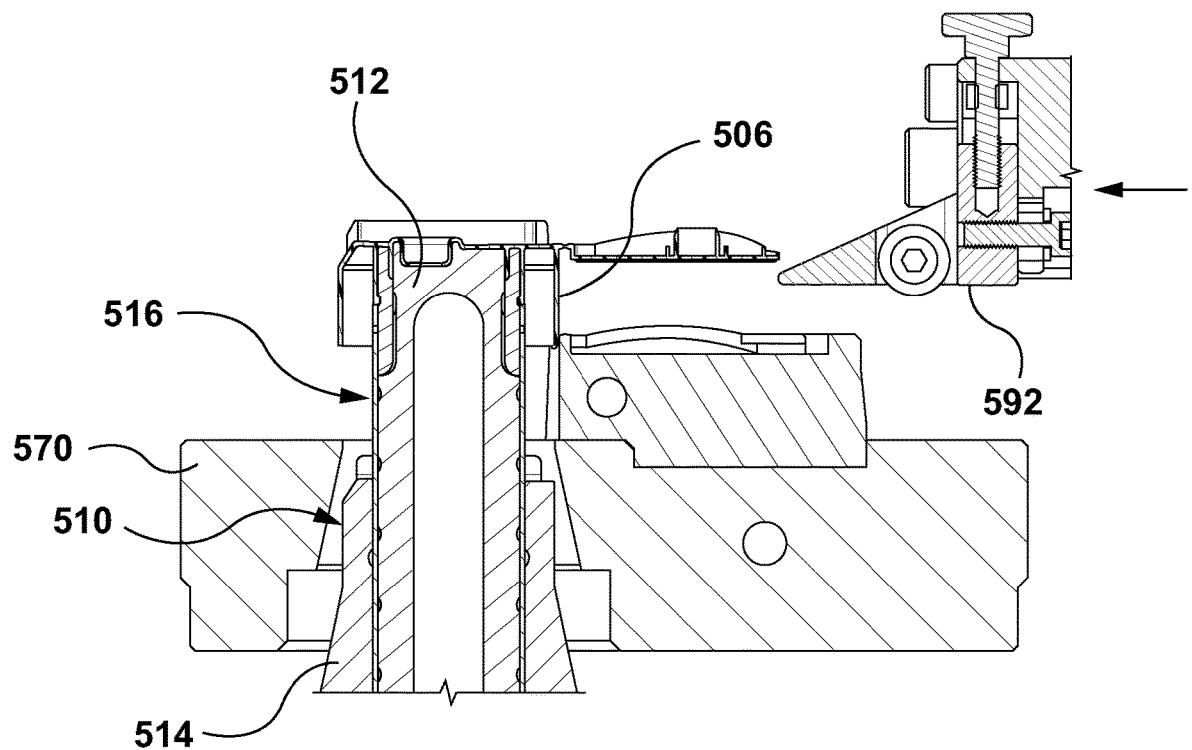
Figure 12:
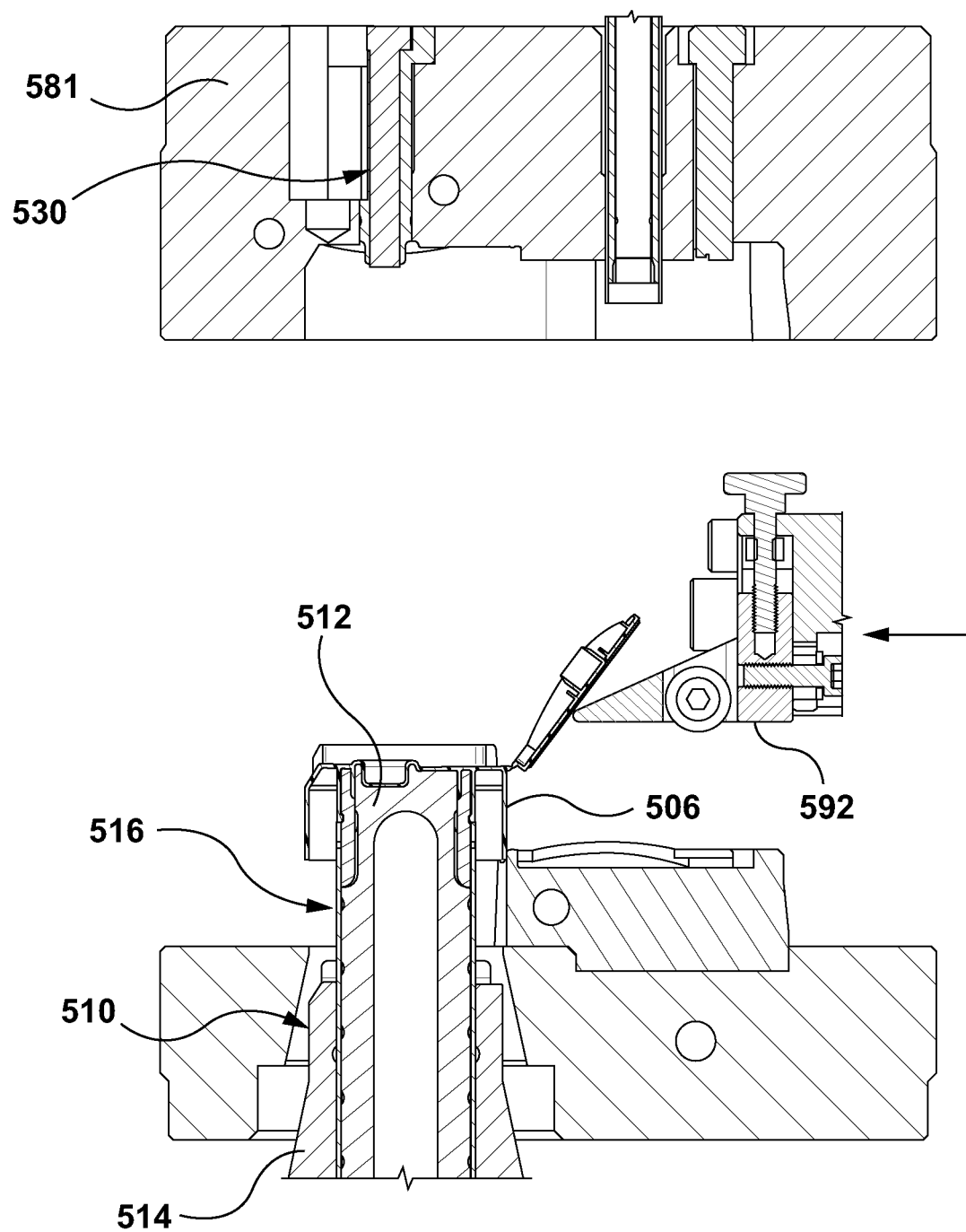
Figure 13:
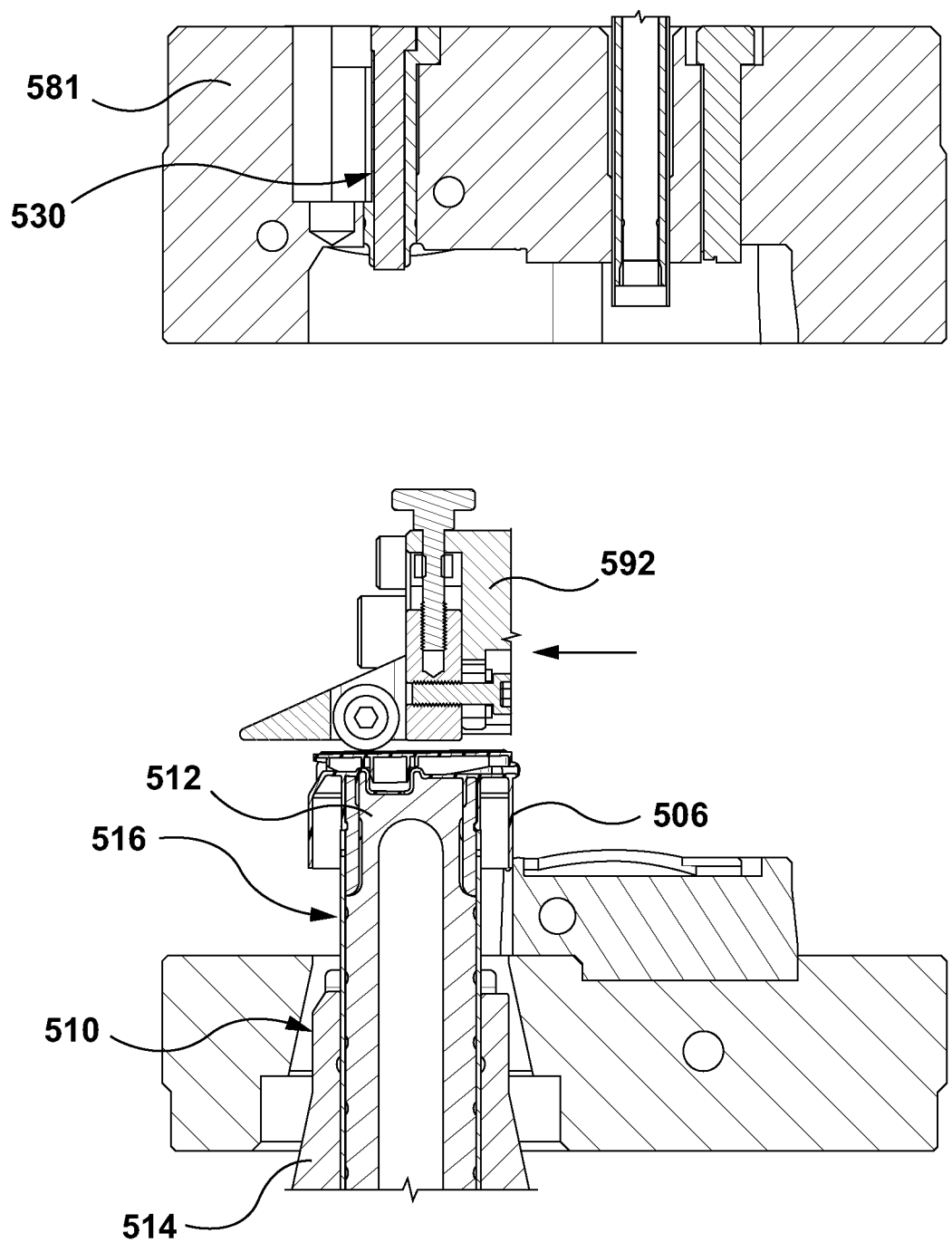
Figure 14:
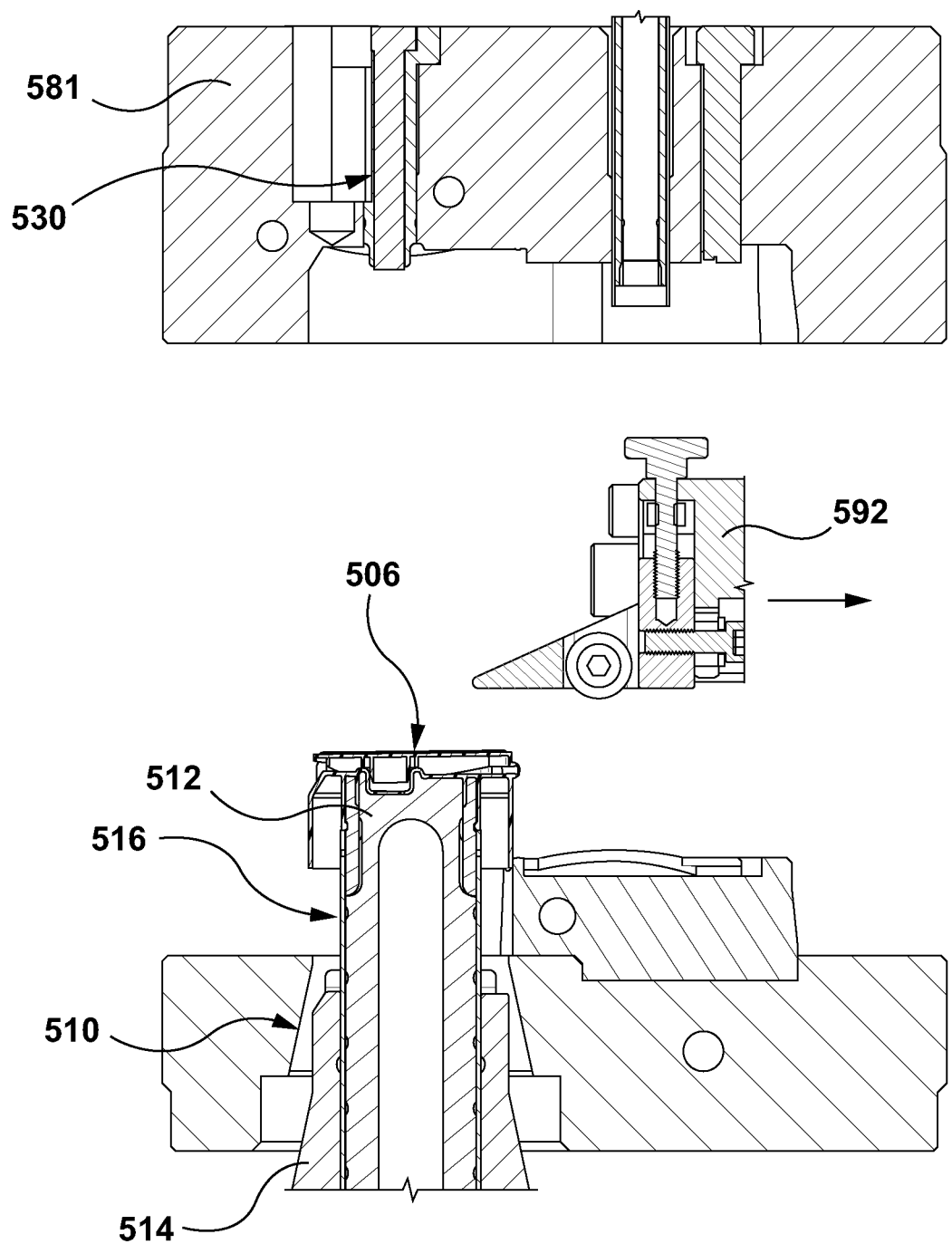

FIG. 11 depicts a flip top portion closing process, where a lid closing device 592 is actuated in a left-ward direction (depicted with an arrow), as viewed in an orientation of FIG. 11. The configuration of the lid closing device 592 is well known in the art and as can be seen through the progression of FIG. 11, FIG. 12, FIG. 13 and FIG. 14—the lid closing device is configured to close the flip top portion of the molded article 506 onto a base portion of the molded article 506, at which point it is retrieved in a right-ward direction (FIG. 14).

Figure 15:
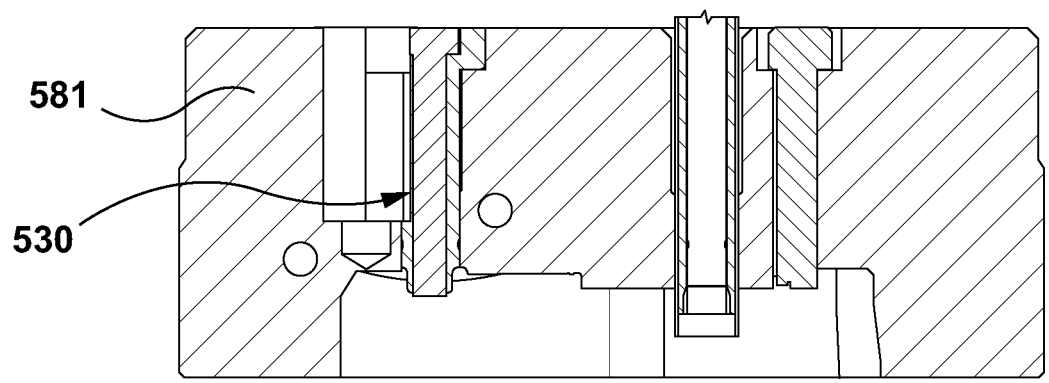
FIG. 15 depicts the first stack portion and the second stack portion at a final stage of the molded article ejection off the inner core.
Figure 15:
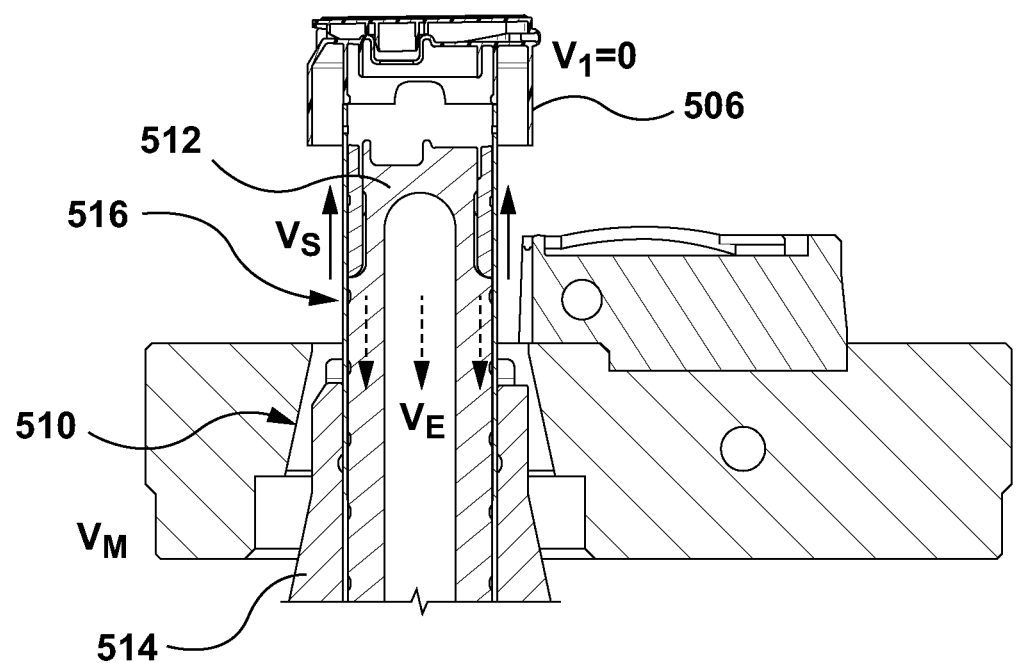

FIG. 15 depicts the first stack portion 510 and the second stack portion 530 at a final stage of the molded article 506 ejection off the inner core 512. During this portion of the ejection phase of the molded article 506, the controller apparatus 180 is configured to execute: controlling velocity of one of: (a) the inner core 512 in a direction away from the second mold shoe 581 (marked as $V_E$) and velocity of the stripper sleeve 516 in a direction towards the second mold shoe 581 (marked as $V_S$).

In accordance with embodiments of the present technology, the controlling is executed such that the molded article 506 is ejected from the inner core 512 (as another example of the molding component) with a substantially zero departure-velocity along the first axis of operation. Therefore and broadly speaking, the controlling the velocity can include coordinating an ejector actuator that is linked to the inner core 512 with a stripper actuator that is linked to the stripper sleeve 516 in opposite directions.

Even though, in the embodiment depicted in FIG. 15, the controlling is executed at the final stage of the molded article 506 ejection off the inner core 512 (where the moveable mold half 502 and more particularly the first mold shoe 570 is no longer moving in the direction away from the second mold shoe 581), the controlling can be executed at an earlier stage of the ejection phase, where the first mold shoe 570 is still moving in the direction away from the second mold shoe 581.

Therefore, it is contemplated that in some embodiments of the present technology, the controlling can include controlling velocity of one or more of (i) the moveable mold half relative to the stationary mold half, and (ii) the ejector relative to the moveable mold half, the controlling executed such that the molded article is ejected from the molding component with a substantially zero departure-velocity along the first axis of operation, and (iii) coordinating the ejector actuator that is linked to the inner core for movement thereof with a stripper actuator that is linked to the stripper sleeve for movement thereof in opposite directions.

Figure 16:
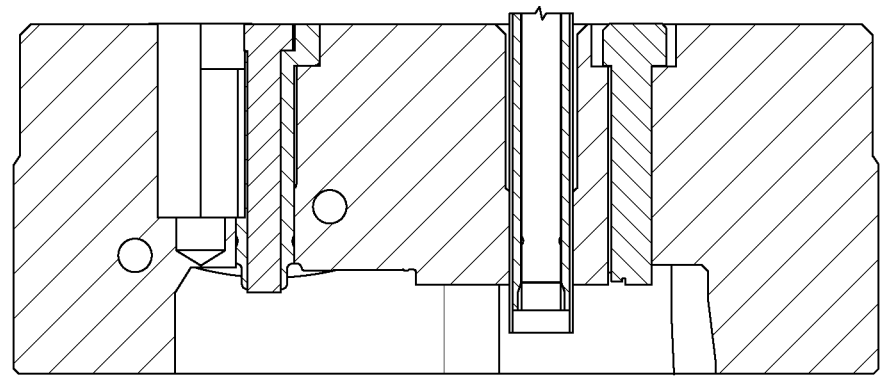
FIG. 16 depicts the first stack portion and the second stack portion with the molded article having been ejected off the inner core.
Figure 16:
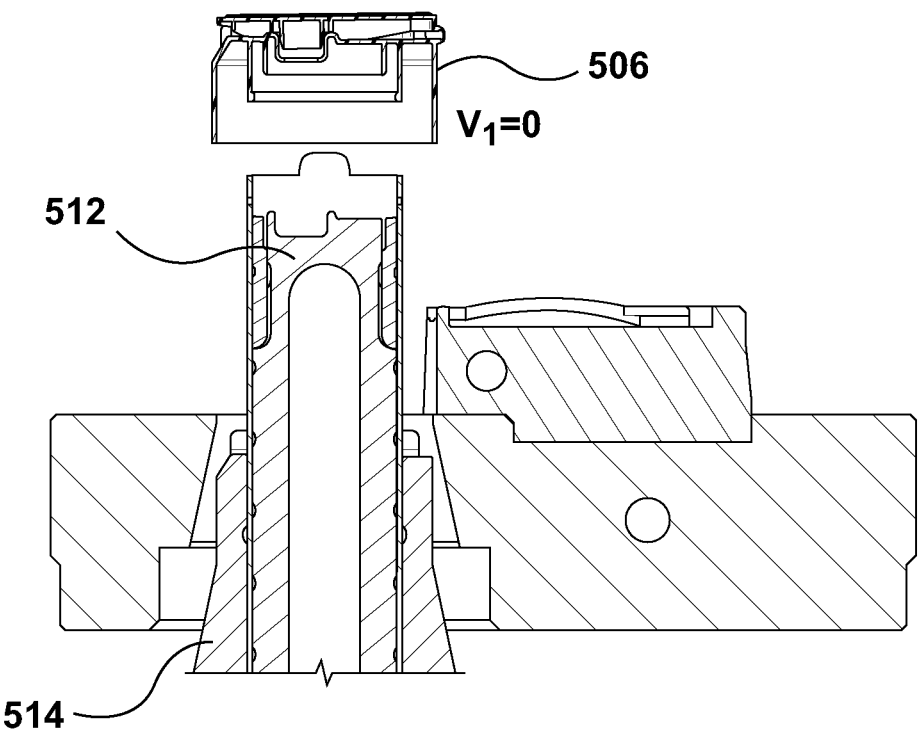

The controlling is executed such that the molded article 506 is ejected from the inner core 512 (as an example of the molding component) with a substantially zero departure-velocity along the first axis of operation (depicted in FIG. 16 as $V_1=0$, which FIG. 16 depicts the molded article 506 having been ejected off the inner core 512). Even though the departure-velocity in FIG. 16 is depicted at zero, this does not need to be so in every embodiment of the present technology. As such, the departure-velocity can be close to zero and, as such, embodiments of the present technology contemplate controlling departure-velocity such that the molded article 506 departs the inner core 512 with a controlled velocity (for example, the controlled velocity can be above zero and close enough to zero to enable the molded article to clear the inner core 512 and other inner cores, but at the same time not to "hit" the stationary half of the mold).

As such, embodiments of the present technology can be summarized as follows, structured in numbered clauses.

Clause 1.

A method (400) of ejecting a molded article (310, 312, 506) from an injection mold (100), the injection mold (100, 500) including a stationary mold half (102, 502) and a movable half (104, 504), the moveable mold half (102, 502) further including a molding component (220A, 220B) for defining, in use, at least a portion of the molded article (310, 312, 506), the molding component (220A, 220B) including a core insert (112, 114, 512, 514) and a stripper sleeve (116, 516) positionable around the core insert (112, 114, 512, 514), the injection mold (100, 500) configured to be used in a molding machine (103), the molding machine (103) having a controller apparatus (180), the method (400) executable by the controller apparatus (180), the method (400) comprising:

during a first portion of a mold opening cycle of the injection mold (100, 500):

initiating opening the injection mold (100, 500) with movement of the moveable mold half (102, 502) through a mold stroke away from the stationary mold half (104, 504) from a mold closed position towards a mold open position;

initiating movement of an ejector (230) of the moveable mold half (102, 502) through an ejector stroke from a molding position towards an ejection position relative to the moveable mold half (102, 502);

the opening the injection mold (100, 500) and moving the ejector (230) being done along a first axis of operation of the injection mold (100, 500) in relatively opposite directions of movement;

during a second portion of the mold opening cycle of the injection mold (100, 500), the second portion occurring later in time relative to the first portion of the mold opening cycle of the injection mold (100, 500):

controlling velocity of at least one of:
(i) the moveable mold half (102, 502) relative to the stationary mold half (104, 504),
(ii) the ejector (230) relative to the moveable mold half (102, 502); and
(iii) an ejector actuator linked to the core insert (112, 114, 512, 514); and (iv) a stripper actuator that is linked to the stripper sleeve (116, 516);

the controlling executed such that the molded article (310, 312, 506) is ejected from the molding component (220A, 220B) with a substantially zero departure-velocity along the first axis of operation the second portion being initiated at a predetermined portion of the mold opening cycle, the predetermined portion being when the molded article (310, 312) is at a final contact point with the molding component (220A, 220B).

Clause 2.

The method (400) of clause 1, wherein the controlling velocity comprises matching velocity, in opposing directions, of one of (i) the moveable mold half (102) with (ii) the ejector (230) and (a) the core insert (112, 114, 512, 514) and the stripper sleeve (116, 516).

Clause 3.

The method (400) of any one of clauses 1 and 2, wherein during (i) the initiating movement of the moveable mold half (102) and (ii) initiating movement of an ejector (230), the velocities of the moveable mold half (102) and the ejector (230) are controlled independently from each other.

Clause 4.

The method (400) of any one of clauses 1 and 3, wherein during (i) the initiating movement of the moveable mold half (102) and (ii) initiating movement of an ejector (230), the velocities of the moveable mold half (102) and the ejector (230) are controlled to minimize an overall mold opening time during the mold opening portion of the cycle of the injection mold (100).

Clause 5.

The method (400) of clause 2, wherein the matching velocity, in opposing directions, of (i) the moveable mold half (102) and (ii) the ejector (230) is only executed during the second portion of the mold opening cycle of the injection mold (200), which substantially coincides with the predetermined portion of the mold opening cycle.

Clause 6.

The method (400) of clause 5, wherein the matching velocity is commenced a first pre-determined period of time before the predetermined portion of the mold opening cycle and continues for a second pre-determined period of time after the predetermined portion of the mold opening cycle.

Clause 7.

The method (400) of clause 2, wherein matching velocity comprises controlling at least one of (i) the opening speed of the moveable mold half (102) and (ii) the speed of the ejector (230).

Clause 8.

The method (400) of clause 2, wherein the molded article (310, 312) is one of a plurality of molded articles (310, 312) that are moldable in the injection mold (100), and wherein matching velocity comprises matching at least one of: (a) velocity of the moveable mold half (102) and (b) velocity of the ejector (230) to an average departure-velocity of the plurality of molded articles (310, 312).

Clause 9.

The method (400) of clause 2, wherein the molded article (310, 312) is one of a plurality of molded articles (310, 312) that are moldable in the injection mold (100), and wherein matching velocity comprises matching at least one of: (a) velocity of the moveable mold half (102) and (b) velocity of the ejector (230) to a departure-velocity of a slowest one of the plurality of molded articles (310, 312).

Clause 10.

The method (400) of any one of clauses 1 to 9, wherein the molded article (310, 312) is a closure (310, 312) having a threaded portion, and wherein the final contact point of the molded article (310, 312) with the molding component occurs when a stripper sleeve (116) portion of the molding component (220A, 220B) clears the threaded portion.

Clause 11.

The method (400) of any one of clauses 1 to 9, wherein the molded article (310, 312) is a closure (310, 312) having a tamper evident band (TEB), and wherein the final contact point of the molded article (310, 312) with the molding component (220A, 220B) occurs when the molding component (220A, 220B) engages only the TEB of the closure (310, 312).

Clause 12.

The method (400) of any one of clauses 1 to 11, further comprising receiving, from an operator of the injection mold (100), an indication of a pre-determined ejection position (210), the pre-determined ejection position (210) being associated with a position of the moveable mold half (102) during its mold stroke and the ejector (230) during its ejector stroke where the molded article (310, 312) is to depart from the molding component (220A, 220B) and wherein the controlling velocity comprises:

commencing execution of controlling velocity at a pre-determined ejection position (210) before the pre-determined ejection position (210).

Clause 13.

The method (400) of clause 12, wherein the commencing execution comprises delaying starting an ejector profile execution.

Clause 14.

The method of any of the clauses 1 to 13, wherein the molded article is one of a plurality of molded articles that are moldable in the mold, and wherein controlling velocity is executed such that to minimize velocity differential between a first departure-velocity of a slowest molded article and a second departure-velocity of a fasted molded article, the first departure-velocity and the second departure-velocity being along the first axis of operation of the injection mold (100).

Clause 15.

The method (400) of any one of clauses 1 to 14, wherein controlling velocity is executed such that the plurality of molded article (310, 312) are ejected from the injection mold (100) substantially only in a direction that is substantially perpendicular to the first axis of operation of the injection mold (100).

Clause 16.

The method of clause 1, wherein said controlling comprises only controlling at least one of:

the ejector actuator linked to the core insert (112, 114, 512, 514); and the stripper actuator that is linked to the stripper sleeve (116, 516).

Clause 17.

The method of clause 16, wherein said controlling comprises: coordinating actuation of the ejector actuator linked to the core insert (512, 514) and the stripper actuator that is linked to the stripper sleeve (516) for movement of the core insert and the stripper sleeve in opposite directions.

Clause 18.

The method of clause 17, wherein the core insert comprises an inner core (512) and an outer core (514) and wherein the only controlling at least one of the ejector actuator linked to the core insert (112, 114, 512, 514); and the stripper actuator that is linked to the stripper sleeve (116, 516) comprises controlling the ejector actuator linked to the inner core.

Clause 19.

A non-transitory computer readable medium, the non-transitory computer readable medium storing computer executable instructions, which computer executable instructions when executed can cause a controller apparatus (180) of a molding machine (103) to a execute a method (400) of ejecting a molded article (310, 312) from an injection mold (100), the injection mold (100) including a stationary mold half (104) and a movable half (102), the moveable mold half (102) further including a molding component (220A, 220B) for defining, in use, at least a portion of the molded article (310, 312), the molding component (220A, 220B) including a core insert (112, 114, 512, 514) and a stripper sleeve (116, 516) positionable around the core insert (112, 114, 512, 514), the injection mold (100, 500) configured to be used in a molding machine (103), the method (400) comprising:

during a first portion of a mold opening cycle of the mold:

initiating opening the injection mold (100) with movement of the moveable mold half (102) through a mold stroke away from the stationary mold half (104) from a mold closed position towards a mold open position;

initiating movement of an ejector (230) of the moveable mold half (102) through an ejector stroke from a molding position towards an ejection position relative to the moveable mold half (102);

the opening the injection mold (100) and moving the ejector (230) being done along a first axis of operation of the injection mold (100) in relatively opposite directions of movement;

during a second portion of the mold opening cycle of the injection mold (100), the second portion occurring later in time relative to the first portion of the mold opening cycle of the injection mold (100):

controlling velocity of at least one of:

(i) the moveable mold half (102, 502) relative to the stationary mold half (104, 504), (ii) the ejector (230) relative to the moveable mold half (102, 502); and (iii) an ejector actuator linked to the core insert (112, 114, 512, 514); and (iv) a stripper actuator that is linked to the stripper sleeve (116, 516);

the controlling executed such that the molded article (310, 312, 506) is ejected from the molding component (220A, 220B) with a substantially zero departure-velocity along the first axis of operation the second portion being initiated at a predetermined portion of the mold opening cycle, the predetermined portion being when the molded article (310, 312) is at a final contact point with the molding component (220A, 220B).

Clause 20.

A molding machine (103) comprising:

an injection unit for plasticizing molding material;

a clamping unit;

an injection mold (100) positionable, in use, in the clamping unit, the injection mold (100) including a stationary mold half (104) and a movable half (102), the moveable mold half (102) further including a molding component (220A, 220B) for defining, in use, at least a portion of a molded article (310, 312) using the molding material, the molding component (220A, 220B) including a core insert (112, 114, 512, 514) and a stripper sleeve (116, 516) positionable around the core insert (112, 114, 512, 514), the injection mold (100, 500) configured to be used in a molding machine (103);

a controller apparatus (180) for controlling operation of at least one of: the movable half (102), the injection unit and the clamping unit, the controller apparatus (180) being configured to: during a first portion of a mold opening cycle of the injection mold (100):

initiate opening the injection mold (100) with movement of the moveable mold half (102) through a mold stroke away from the stationary mold half (104) from a mold closed position towards a mold open position;

initiate movement of an ejector (230) of the moveable mold half (102) through an ejector stroke from a molding position towards an ejection position relative to the moveable mold half (102); the opening the injection mold (100) and moving the ejector (230) being done along a first axis of operation of the injection mold (100) in relatively opposite directions of movement;

during a second portion of the mold opening cycle of the injection mold (100), the second portion occurring later in time relative to the first portion of the mold opening cycle of the injection mold (100):

control velocity of at least one of:
(i) the moveable mold half (102, 502) relative to the stationary mold half (104, 504),
(ii) the ejector (230) relative to the moveable mold half (102, 502); and
(iii) an ejector actuator linked to the core insert (112, 114, 512, 514); and
(iv) a stripper actuator that is linked to the stripper sleeve (116, 516);
the controlling executed such that the molded article (310, 312, 506) is ejected from the molding component (220A, 220B) with a substantially zero departure-velocity along the first axis of operation;
the second portion being initiated at a predetermined portion of the mold opening cycle, the predetermined portion being when the molded article (310, 312) is at a final contact point with the molding component (220A, 220B).

It is noted that the foregoing has outlined some of the more pertinent non-limiting embodiments. These non-limiting embodiments may be used for many applications. Thus, although the description is made for particular arrangements and methods, the intent and concept of these non-limiting embodiments may be suitable and applicable to other arrangements and applications. It will be clear to those skilled in the art that modifications to the disclosed non-limiting embodiments can be effected. The described non-limiting embodiments ought to be construed to be merely illustrative of some of the more prominent features and applications thereof. Other beneficial results can be realized by applying these non-limiting embodiments in a different manner or modifying them in ways known to those familiar with the art. This includes the mixing and matching of features, elements and/or functions between various non-limiting embodiments is expressly contemplated herein, unless described otherwise, above.

What is claimed is:

1. A method of ejecting a molded article from an injection mold, the injection mold including a stationary mold half and a movable half, the moveable mold half further including a molding component for defining, in use, at least a portion of the molded article, the molding component including a core insert and a stripper sleeve positionable around the core insert, the injection mold configured to be used in a molding machine, the molding machine having a controller apparatus, the method executable by the controller apparatus, the method comprising:

during a first portion of a mold opening cycle of the injection mold:

initiating opening the injection mold with movement of the moveable mold half through a mold stroke away from the stationary mold half from a mold closed position towards a mold open position;

initiating movement of an ejector of the moveable mold half through an ejector stroke from a molding position towards an ejection position relative to the moveable mold half;

the opening the injection mold and moving the ejector being done along a first axis of operation of the injection mold in relatively opposite directions of movement;

during a second portion of the mold opening cycle of the injection mold, the second portion occurring later in time relative to the first portion of the mold opening cycle of the injection mold:

controlling velocity of at least one of:
(i) the moveable mold half relative to the stationary mold half,
(ii) the ejector relative to the moveable mold half; and
(iii) an ejector actuator linked to the core insert relative to a stripper actuator that is linked to the stripper sleeve; and
(iv) a stripper actuator that is linked to the stripper sleeve relative to the ejector actuator linked to the core insert;
the controlling executed such that the molded article is ejected from the molding component with a substantially zero departure-velocity along the first axis of operation
the second portion being initiated at a predetermined portion of the mold opening cycle, the predetermined portion being when the molded article is at a final contact point with the molding component.

2. The method of claim 1, wherein the controlling velocity comprises matching velocity, in opposing directions, of one of (i) the moveable mold half with (ii) the ejector and (a) the core insert and the stripper sleeve.

3. The method of claim 1, wherein during (i) the initiating movement of the moveable mold half and (ii) initiating movement of an ejector, the velocities of the moveable mold half and the ejector are controlled independently from each other.

4. The method of claim 1, wherein during (i) the initiating movement of the moveable mold half and (ii) initiating movement of an ejector, the velocities of the moveable mold half and the ejector are controlled to minimize an overall mold opening time during the mold opening portion of the cycle of the injection mold.

5. The method of claim 2, wherein the matching velocity, in opposing directions, of (i) the moveable mold half and (ii) the ejector is only executed during the second portion of the mold opening cycle of the injection mold, which substantially coincides with the predetermined portion of the mold opening cycle.

6. The method of claim 5, wherein the matching velocity is commenced a first pre-determined period of time before the predetermined portion of the mold opening cycle and continues for a second pre-determined period of time after the predetermined portion of the mold opening cycle.

7. The method of claim 2, wherein matching velocity comprises controlling at least one of (i) the opening speed of the moveable mold half and (ii) the speed of the ejector.

8. The method of claim 2, wherein the molded article is one of a plurality of molded articles that are moldable in the injection mold, and wherein matching velocity comprises matching at least one of: (a) velocity of the moveable mold half and (b) velocity of the ejector to an average departure-velocity of the plurality of molded articles.

9. The method of claim 2, wherein the molded article is one of a plurality of molded articles that are moldable in the injection mold, and wherein matching velocity comprises matching at least one of: (a) velocity of the moveable mold half and (b) velocity of the ejector to a departure-velocity of a slowest one of the plurality of molded articles.

10. The method of claim 1, wherein the molded article is a closure having a threaded portion, and wherein the final contact point of the molded article with the molding component occurs when a stripper sleeve portion of the molding component clears the article from the threaded portion of the mold outer core.

11. The method of claim 1, wherein the molded article is a closure having a tamper evident band (TEB), and wherein the final contact point of the molded article with the molding component occurs when the molding component engages only the TEB of the closure.

12. The method of claim 1, further comprising receiving, from an operator of the injection mold, an indication of a pre-determined ejection position, the pre-determined ejection position being associated with a position of the moveable mold half during its mold stroke and the ejector during its ejector stroke where the molded article is to depart from the molding component and wherein the controlling velocity comprises: commencing execution of controlling velocity at a pre-determined ejection position before the pre-determined ejection position.

13. The method of claim 12, wherein the commencing execution comprises delaying starting an ejector profile execution.

14. The method of claim 1, wherein the molded article is one of a plurality of molded articles that are moldable in the mold, and wherein controlling velocity is executed such that to minimize velocity differential between a first departure-velocity of a slowest molded article and a second departure-velocity of a fastest molded article, the first departure-velocity and the second departure-velocity being along the first axis of operation of the injection mold.

15. The method of claim 1, wherein controlling velocity is executed such that the plurality of molded article are ejected from the injection mold substantially only in a direction that is substantially perpendicular to the first axis of operation of the injection mold.

16. The method of claim 1, wherein said controlling comprises only controlling at least one of:

the ejector actuator linked to the core insert; and the stripper actuator that is linked to the stripper sleeve.

17. The method of claim 16, wherein said controlling comprises: coordinating actuation of the ejector actuator linked to the core insert and the stripper actuator that is linked to the stripper sleeve for movement of the core insert and the stripper sleeve in opposite directions.

18. The method of claim 17, wherein the core insert comprises an inner core and an outer core and wherein the only controlling at least one of the ejector actuator linked to the core insert; and the stripper actuator that is linked to the stripper sleeve comprises controlling the ejector actuator linked to the inner core.

* * * * *